US011721158B2

(12) United States Patent
Braido et al.

(10) Patent No.: US 11,721,158 B2
(45) Date of Patent: Aug. 8, 2023

(54) APPARATUS, METHODS AND SYSTEMS FOR DISPENSING AN ITEM FROM A DISPENSING APPARATUS

(71) Applicant: RoboBurger Enterprises Inc., Newark, NJ (US)

(72) Inventors: Daniel Braido, Jersey City, NJ (US); Audley Wilson, Jersey City, NJ (US); Christopher Carbonaro, Staten Island, NY (US); Justin Dawber, Pittsburgh, PA (US); Theodore Halbach, Newark, NJ (US)

( * ) Notice: Subject to any disclaimer, the term of this patent is extended or adjusted under 35 U.S.C. 154(b) by 0 days.

(21) Appl. No.: 18/077,913

(22) Filed: Dec. 8, 2022

(65) Prior Publication Data

US 2023/0104846 A1   Apr. 6, 2023

Related U.S. Application Data

(63) Continuation-in-part of application No. PCT/US2022/035910, filed on Jul. 1, 2022, which is
(Continued)

(51) Int. Cl.
*G07F 11/58*   (2006.01)
*B65G 13/02*   (2006.01)

(52) U.S. Cl.
CPC .............. *G07F 11/58* (2013.01); *B65G 13/02* (2013.01)

(58) Field of Classification Search
CPC ............................... G07F 11/58; B65G 13/02
See application file for complete search history.

(56) References Cited

U.S. PATENT DOCUMENTS 4,813,572 A * 3/1989 Schmidt ............... G07F 17/0078
99/357
5,245,150 A * 9/1993 Grandi ................ G07F 17/0078
221/6
(Continued)

FOREIGN PATENT DOCUMENTS

GB   257344 A   8/1926
GB   735649 A   8/1955
(Continued)

OTHER PUBLICATIONS

Canicas, Erick, Device for Preserving, Cooking and Automatically Dispensing Pasta Products, in Particular Breaded Products, Apr. 30, 2010, France, FR-2937501-A1 (see office action for pertinent pages) (Year: 2010).*
(Continued)

*Primary Examiner* — Gene O Crawford
*Assistant Examiner* — Lester Ill Rushin
(74) *Attorney, Agent, or Firm* — Derek Fahey, Esq.; The IP Plus Firm, PLLC

(57) ABSTRACT

A system for dispensing an item from a dispensing apparatus is disclosed. The system is attached to a dispensing apparatus lower portion of the dispensing apparatus. The system includes a plate and a flap movably attached to the plate. The flap has a flap open position and a flap closed position. As stop extends outward from a flap first surface of a flap lower portion. A movable arm is in attachment with the flap and moves the flap between the flap open position and the flap closed position. A heating element at least proximate to the flap. An opening on the flap extends between the flap first surface and a flap second surface. A rod is substantially vertically arranged and in attachment with the plate and configured such that the rod passes through the opening
(Continued)

when the flap moves between the flap open position and the flap closed position.

19 Claims, 21 Drawing Sheets

Related U.S. Application Data a continuation of application No. 17/375,038, filed on Jul. 14, 2021, now Pat. No. 11,335,154.

(56) References Cited

U.S. PATENT DOCUMENTS

| | | | |
|---|---|---|---|
| 2007/0073440 A1* | 3/2007 | Ohkubo | G07F 11/58 700/231 |
| 2017/0365123 A1 | 12/2017 | Varley et al. | |

FOREIGN PATENT DOCUMENTS

| | | |
|---|---|---|
| KR | 20010065538 A | 7/2001 |
| WO | 2022172144 A1 | 8/2022 |

OTHER PUBLICATIONS

Canicas, Erick, Device for Preserving, Cooking and Automatically Dispensing Pasta Products, in Particular Breaded Products, (English language description only from WO 2010049648 A1) (Year: 2010).*

* cited by examiner

APPARATUS, METHODS AND SYSTEMS FOR DISPENSING AN ITEM FROM A DISPENSING APPARATUS

CROSS-REFERENCE TO RELATED APPLICATIONS

This application is a continuation in part application of PCT application no. PCT/US22/35910, filed Jul. 1, 2022 and entitled APPARATUS, METHODS AND SYSTEMS FOR STORING AND CONVEYING ITEMS WITHIN A FOOD DELIVERY APPARATUS", which claims the benefit of U.S. patent application Ser. No. 17/375,038 filed Jul. 14, 2021 and entitled "APPARATUS, METHODS AND SYSTEMS FOR STORING AND CONVEYING ITEMS WITHIN A FOOD DELIVERY APPARATUS", now patented as U.S. Pat. No. 11,335,154, the subject matter of which is incorporated herein by reference.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The present invention relates to the field of food preparation, and more specifically to the field of automated food preparation devices.

BACKGROUND

One challenge faced when dispensing items from vending machines is items, such as food items, getting stuck on certain parts of the machine. Additionally, other challenges faced heating using heating elements to heat, warm, cook or toast certain food items is that the heating element may cause certain heat sensitive components of the vending machine to malfunction. Given the impact of these factors, there exists a need to improve over the prior art and more particularly, for devices that overcome the challenges mentioned above.

SUMMARY

This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a system for dispensing an item from a dispensing apparatus is disclosed. The system is attached to a lower portion of a dispensing apparatus. The system includes a plate and a flap movably attached to the plate. The flap has a flap open position and a flap closed position. A stop extends outward from a flap first surface of a flap lower portion. A movable arm is in attachment with the flap and moves the flap between the flap open position and the flap closed position. A heating element is attached or at least proximate to the flap. An opening on the flap extends between the flap first surface and a flap second surface. A rod is substantially vertically arranged and in attachment with the plate and configured such that the rod passes through the opening when the flap moves between the flap open position and the flap closed position.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein.

DETAILED DESCRIPTION

Figure 1A:
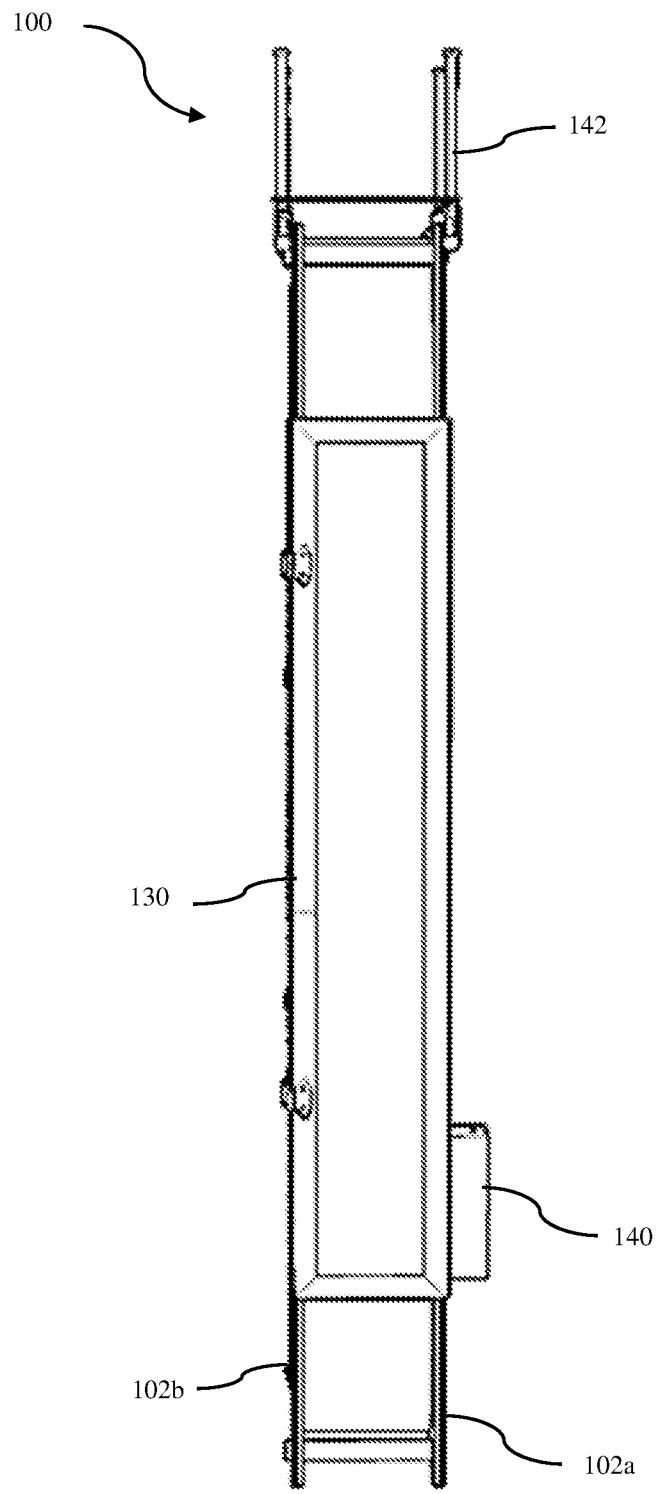
FIG. 1a is a front view of a cartridge for storing and conveying food items, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a plate having an opening such that a rod may pass through the plate when the plate moves between the plate closed position and the plate open position. This rod forces food items to be removed and property dispensed. Another improvement over the prior art is having a sensor for detecting if the food item is on the plate positioned away from the plate and the heating element so that the heating element decreases significantly the effect on the sensor and potential for sensor to malfunction. The actuator (motor) which drives the system is also attached in such a way as to reduce heat damage.

Figure 1B:
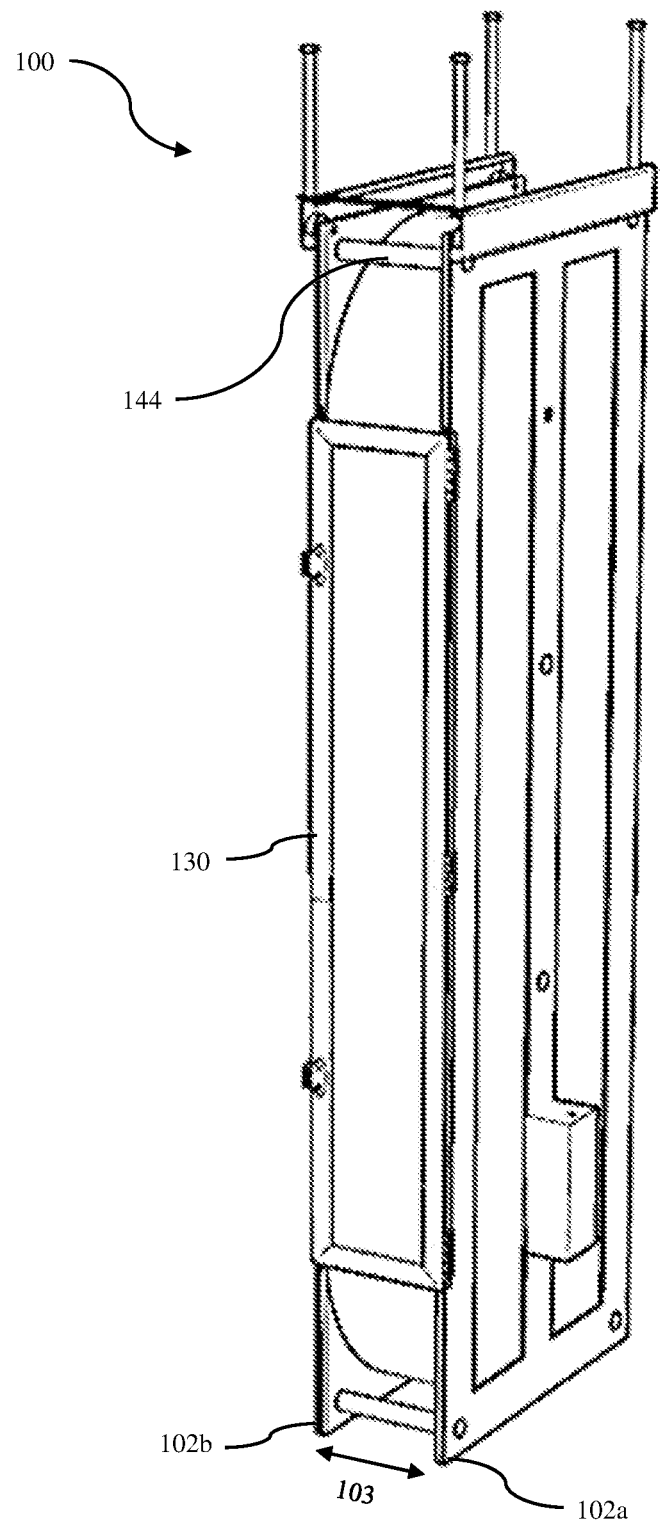
FIG. 1b is a perspective view of a cartridge for storing and conveying food items, according to an example embodiment.
Figure 1C:
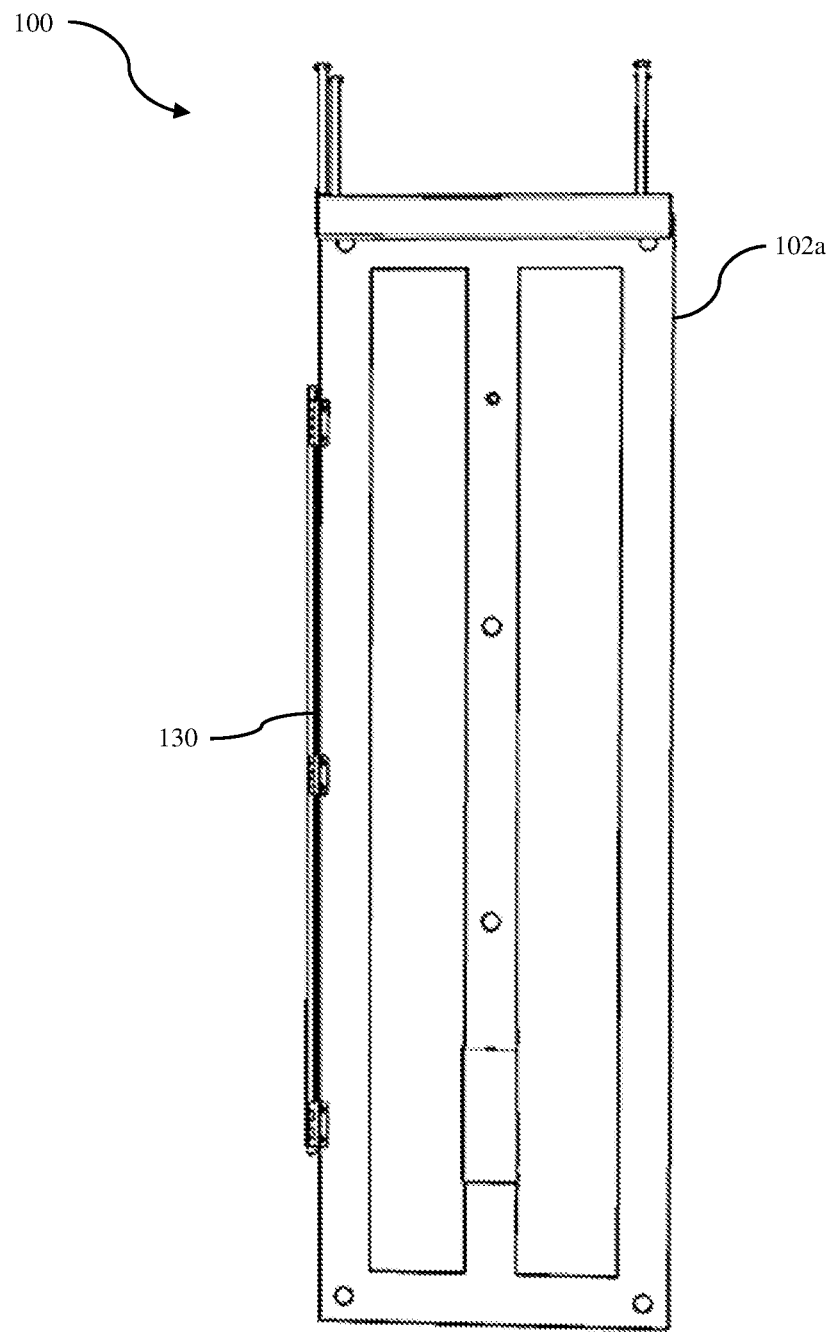
FIG. 1c is a first side view of a cartridge for storing and conveying food items, illustrating a motor (located inside a housing), according to an example embodiment.
Figure 1D:
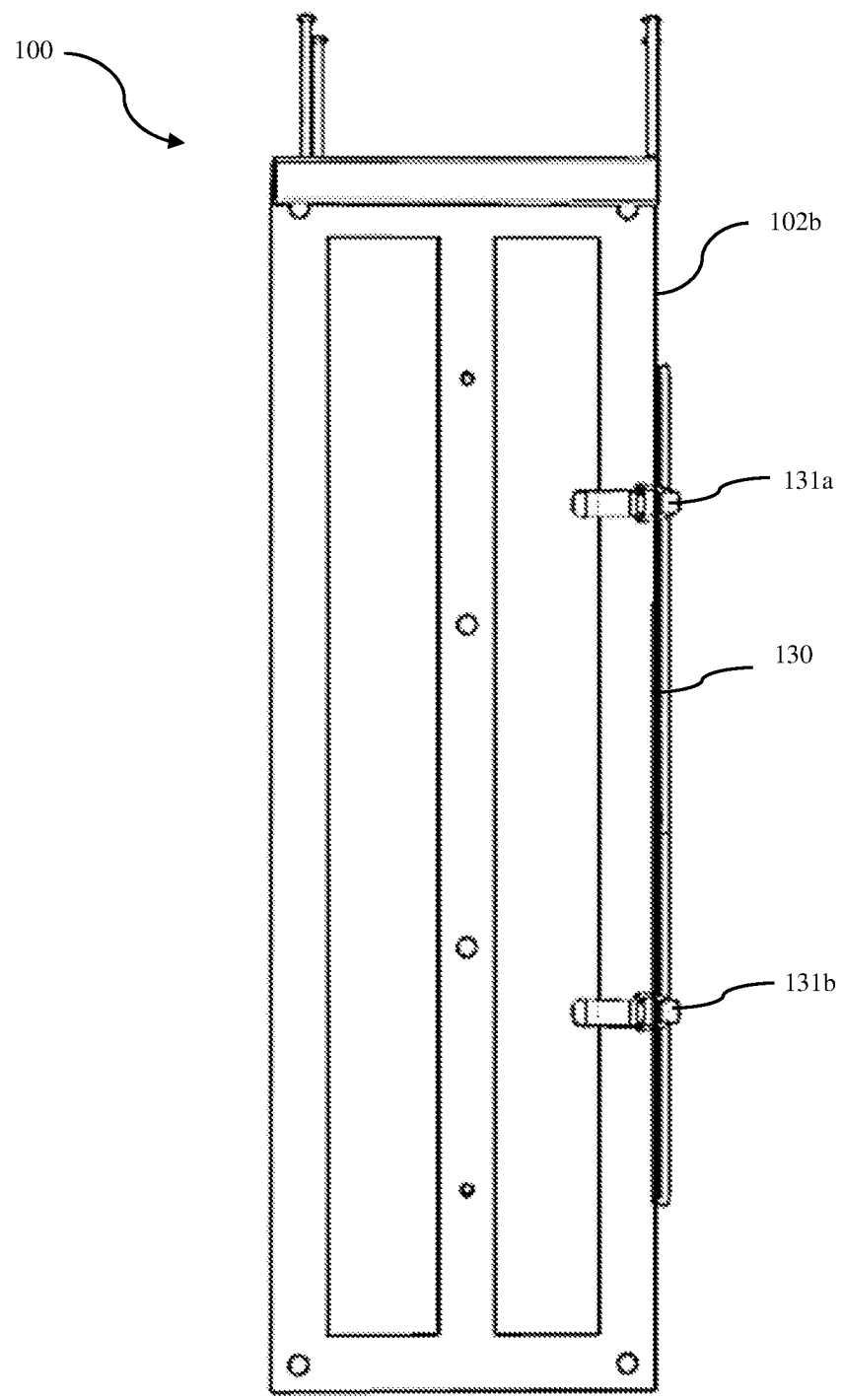
FIG. 1d is a second side view of a cartridge for storing and conveying food items, according to an example embodiment.

Referring now to the Figures, and to FIGS. 1a-1d specifically, a cartridge (100) to be used in a food delivery apparatus is shown. FIG. 1a shows a side view of the cartridge (100), FIG. 1b shows a perspective view of the cartridge (100), FIG. 1c shows a first side view of the cartridge (100) and FIG. 1d shows a second side view of the cartridge. As shown, the cartridge (100) includes a housing (101) defined by a plurality of walls (102a-102b) defining a main cavity (103) inside the housing. In the present embodiment, it is understood that the term cavity or main cavity means a space between the at least two walls. In the present embodiment, the housing only has two walls. However, it is understood that in other embodiments, additional walls or panels may be used and are within the spirit and scope of the present invention. The plurality of walls (102a-102b) may be made of any suitable material. For instance, the walls may be comprised of or consist of a metal or metal alloy, or a polymeric material. Preferably, the walls consist of a metal or metal alloy having a smooth surface that enables rapid and complete sanitization of the surface when necessary. In a preferred embodiment, the walls comprise or consist of an aluminum alloy. For instance, aluminum alloys such as a lxxx series aluminum alloy, a 3xxx series aluminum alloy, 5xxx series aluminum alloy, or a 6xxx series aluminum alloy may be used. A stainless-steel alloy, such as grades 304, 316, or 400 may also be used. The walls may be sealed with silicone rubber to obtain a hermetic seal.

Figure 2A:
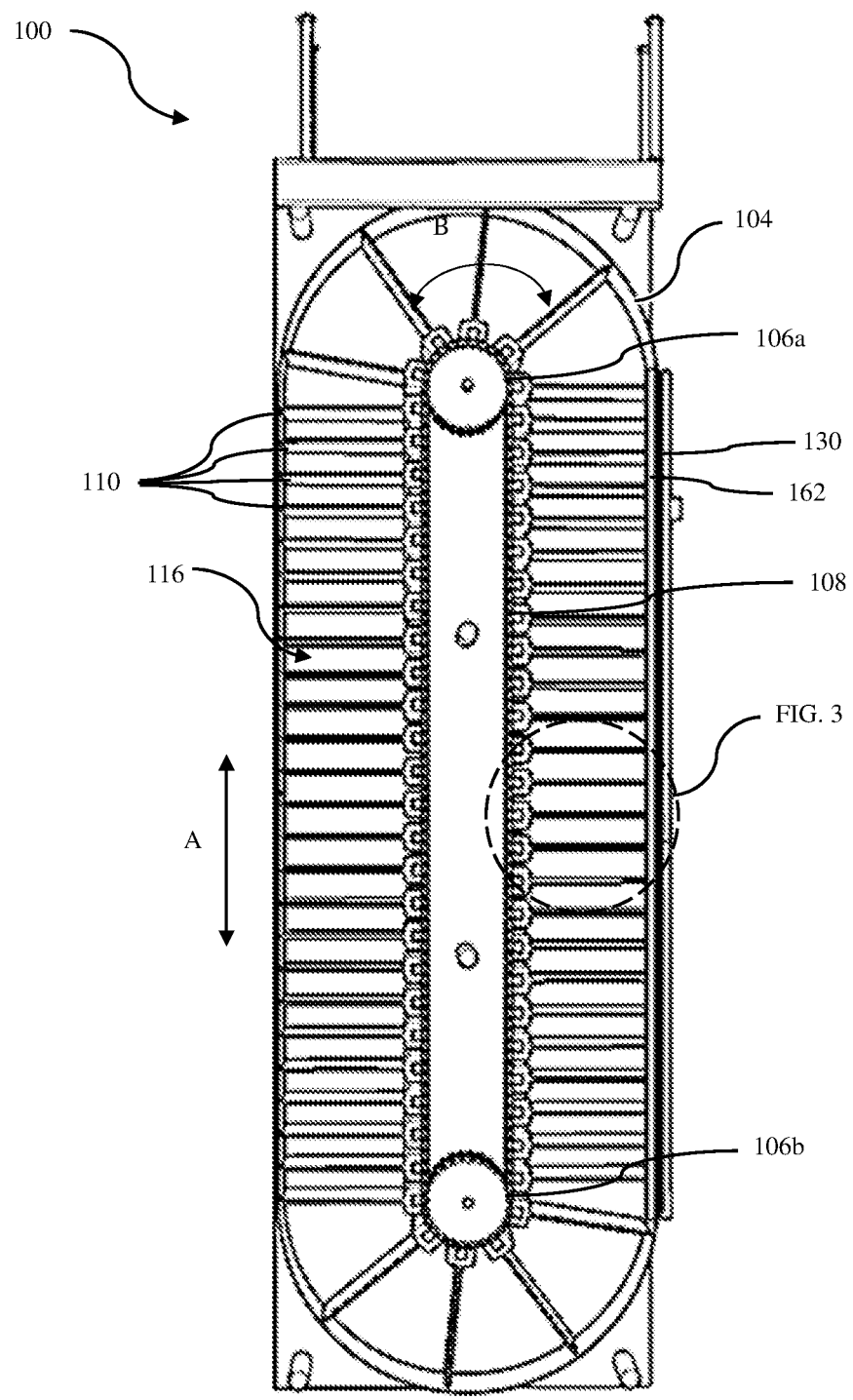
FIG. 2a is a cutaway, side view of a cartridge for storing and conveying food items, according to an example embodiment.

The cartridge also includes a first movable door (130) covering a first opening (131). The first opening provides access to inside the outer looped element between the two walls (102a-102b) of the housing. The food cartridge (100) may be locked using at least one fastener, such as the clasp and clasp hook fasteners (131a and 131b) depicted in the figures. The fasteners may be similarly made of a metal, metal alloy, or polymeric material as described above. The aluminum alloys and stainless-steel alloys may be used, for example, as materials in the fasteners. The door (130) provides access to the cartridge when the cartridge (100) is to be filled with food items. As will be described below, the cartridge includes a plurality of movable chambers defined by a plurality of panels for placing the food items. A first portion of the plurality of chambers may be accessed when the door (130) is open and provides access into the chamber via the first opening (131). The movable inner looped element may be rotated, such that the operator can access the second portion of the plurality of chambers, as needed. In one embodiment, an inward facing wall portion (162) of the first movable door (130) at least partially defines the outer looped element and covers a first opening (131) (as illustrated in FIG. 2a). The movable door may include gaskets such that it provides a seal or hermetically sealed chamber.

The cartridge (100) may be mounted in any machine or device for preparing food. In the depicted embodiment, the cartridge (100) is envisioned for use in a vending machine. The cartridge (100) may be mounted within an enclosure. For instance, cartridge (100) may include carriage bolts (142) at an upper end of the cartridge (100) for hanging the cartridge inside of a vending machine. In other embodiments, the cartridge may be fastened or mounted to the vending machine by other means. For example, the cartridge may be mounted by rails to the vending machine. However, other means for mounting or attaching the cartridge to the vending machine may be used and is within the spirit and scope of the present invention. The cartridge design could also allow for the cartridge to rest on a surface, or to be hung using other portions of the cartridge. For instance, spacer rods (144) may be used to hang the cartridge. Moreover, spacer rods (144) provide structure to the device through connection with the walls (102a, 102b). The spacer rods (144) also dampen torsion stresses that may be placed upon the cartridge.

In another aspect of the invention, the cartridge (100) design may use a variety of fasteners that do not require any tool(s) to fasten or unfasten. The use of such fasteners may be necessary to comply with local or national laws and regulations. In this aspect, fasteners such as thumb screws, wing nuts, and cotter pin clips may be used, among others.

Figure 2B:
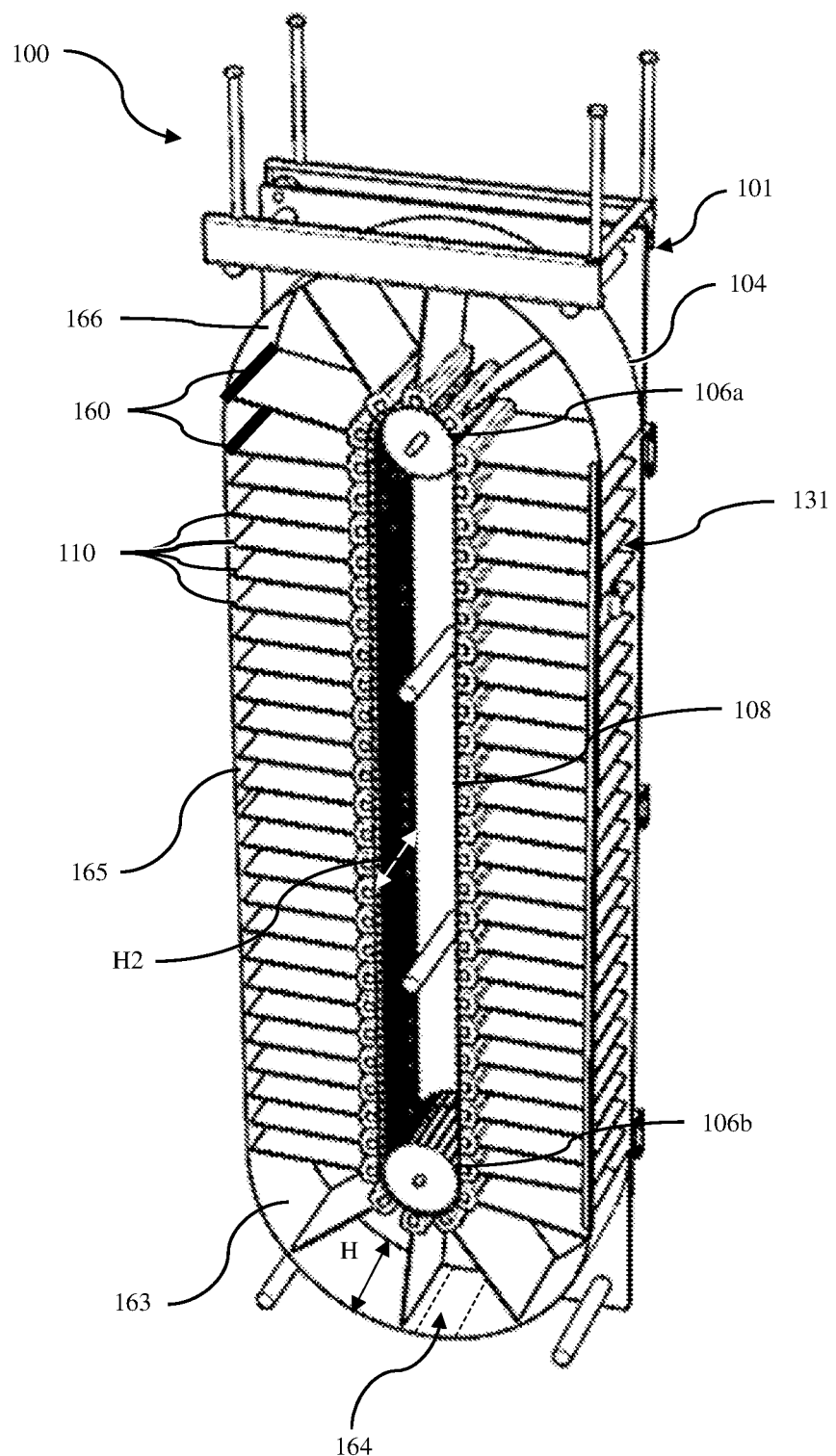
FIG. 2b is a cutaway, perspective side view of a cartridge for storing and conveying food items, according to an example embodiment.

With reference to the figures now including FIGS. 2a-2b, the inner components of the cartridge (100) of FIGS. 1a-1d are shown. In this regard, FIG. 1a shows a front view of the inner components of the cartridge (100), and FIG. 2b shows a perspective view of the inner components. The cartridge as illustrated (100) includes an outer looped element (104) affixed at least partially in the main cavity (103). In one embodiment, the outer looped element (104) is elongated and has a length that spans substantially all of a full length of the housing. Furthermore, the outer looped element (104) has a height H that spans from a first inside surface of a first side wall of one of the plurality of walls (102a) to a second inside surface of a second side wall of one of the plurality of walls (102a). The outer looped element (104) may be rigid. For instance, the outer looped element may be fabricated from any suitable material, such as a metal, metal alloy, or polymeric material. As illustrated in FIG. 2a, the inward facing wall portion (162) of the door (130) at partially defines the inward facing wall of the outer looped element. In one embodiment, the inward facing wall is such that the inward facing wall portion (162) of the first movable door (130) at least partially defines the outer looped element (104) and covers the first opening (131) such that a completely looped shaped element is defined. Additionally, the inward facing wall portion (162) of the first movable door (130) may be configured to be substantially "flush" with the other sections of the inward facing wall (162, 163, 165, 166) of the outer looped element defining the entire looped inward facing wall.

Similar to the outer looped element, the inner looped element (108) has a height (H2) that spans from a first inside surface of a first side wall of one of the plurality of walls (102a) to a second inside surface of a second side wall of one of the plurality of walls (102a) such that the sides of the inner looped element (or seal attached to the inner looped element) create a seal, a hermetic seal or at least a portion of a hermetic seal of the chamber. In certain embodiments, at least a partially hermetically sealed chamber is formed by combination of (i) the side edges (or sealing elements attached thereto) of the inner looped element (108) abutting the inside surface of the opposing walls, (ii) the second end of the panels (or sealing elements attached thereto) abutting the outer looped element, and (iii) the sides (or sealing elements attached thereto) of the outer looped element abutting the opposing walls. However, it is understood that different variations may be used to provide a hermetically sealed chamber may be used and are within the spirit and scope of the present invention.

As mentioned above, the aluminum alloy or stainless-steel alloy materials may be used. In one embodiment, a 3xxx series aluminum alloy is used. In one embodiment, the aluminum alloy is AA3003. However other materials may be used and are within the spirit and scope of the present invention.

Figure 4A:
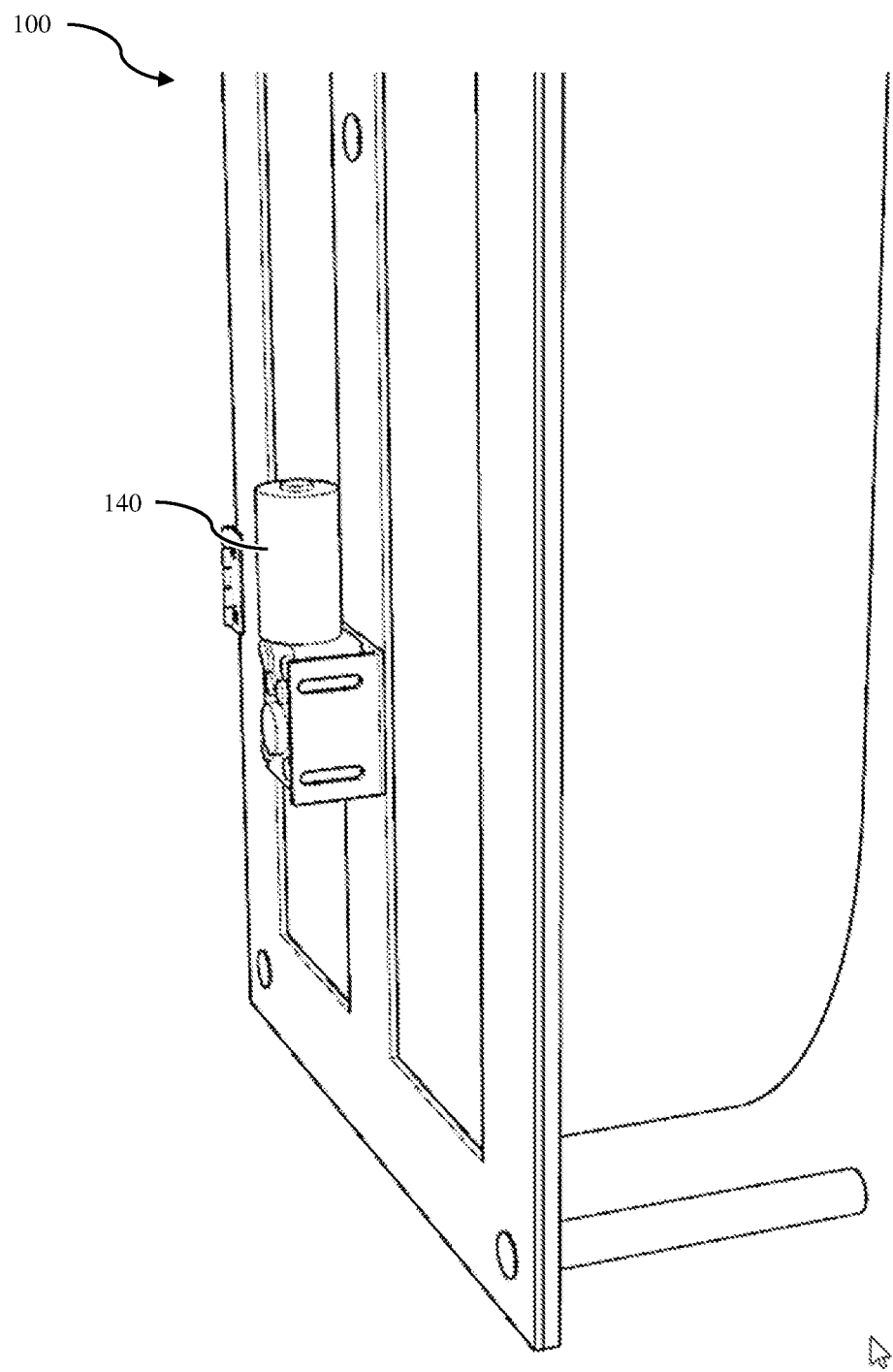
FIG. 4a is a side perspective view of a cartridge for storing and conveying food items showing a cutaway of the housing for a motor that drive a plurality of rotatable rollers, according to an example embodiment.
Figure 4B:
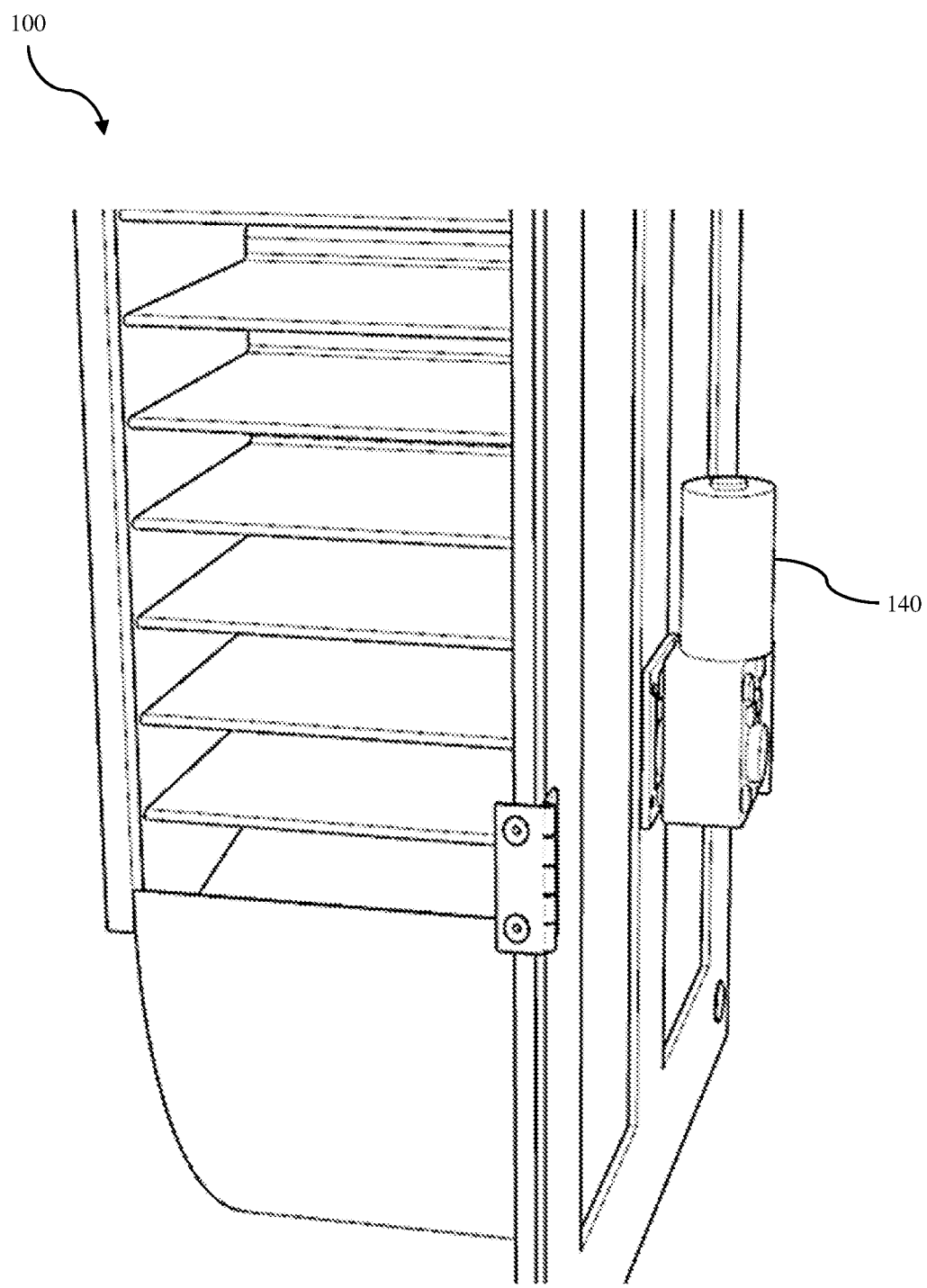
FIG. 4b is a second side view (cutaway) of a cartridge for storing and conveying food items showing a cutaway of the housing for a motor that drive a plurality of rotatable rollers, according to an example embodiment.

The cartridge (100) also includes a plurality of rotatable rollers (106a-106b) spaced apart from each other and positioned inside the outer looped element (104), and a movable inner looped element (108) mounted on the plurality of rotatable rollers (106a-106b) and positioned inside the outer looped element (104). The spacing between the rollers may depend on what is being conveyed and the number of chambers that the cartridge requires. However, in other embodiments, a single roller may which is still in the spirt and scope of the present invention. The cartridge (100) may comprise a motor (140) that when powered rotates at least one of the pluralities of rotatable rollers (106a) so that the movable inner looped element (108) moves. By way of example, the motor may rotate the roller (in the either direction illustrated by curved line B) to move the panels and chambers (in the direction illustrated by line A). Motor (140) is shown by FIGS. 4a-4b. The rotatable rollers (106a-106b) may be hermetically sealed to prevent the accumulation of any food particles inside the rollers. Thus, the hermetically sealed rollers (106a-106b) may provide protection against contamination of the food items stored in the cartridge (100).

Figure 3:
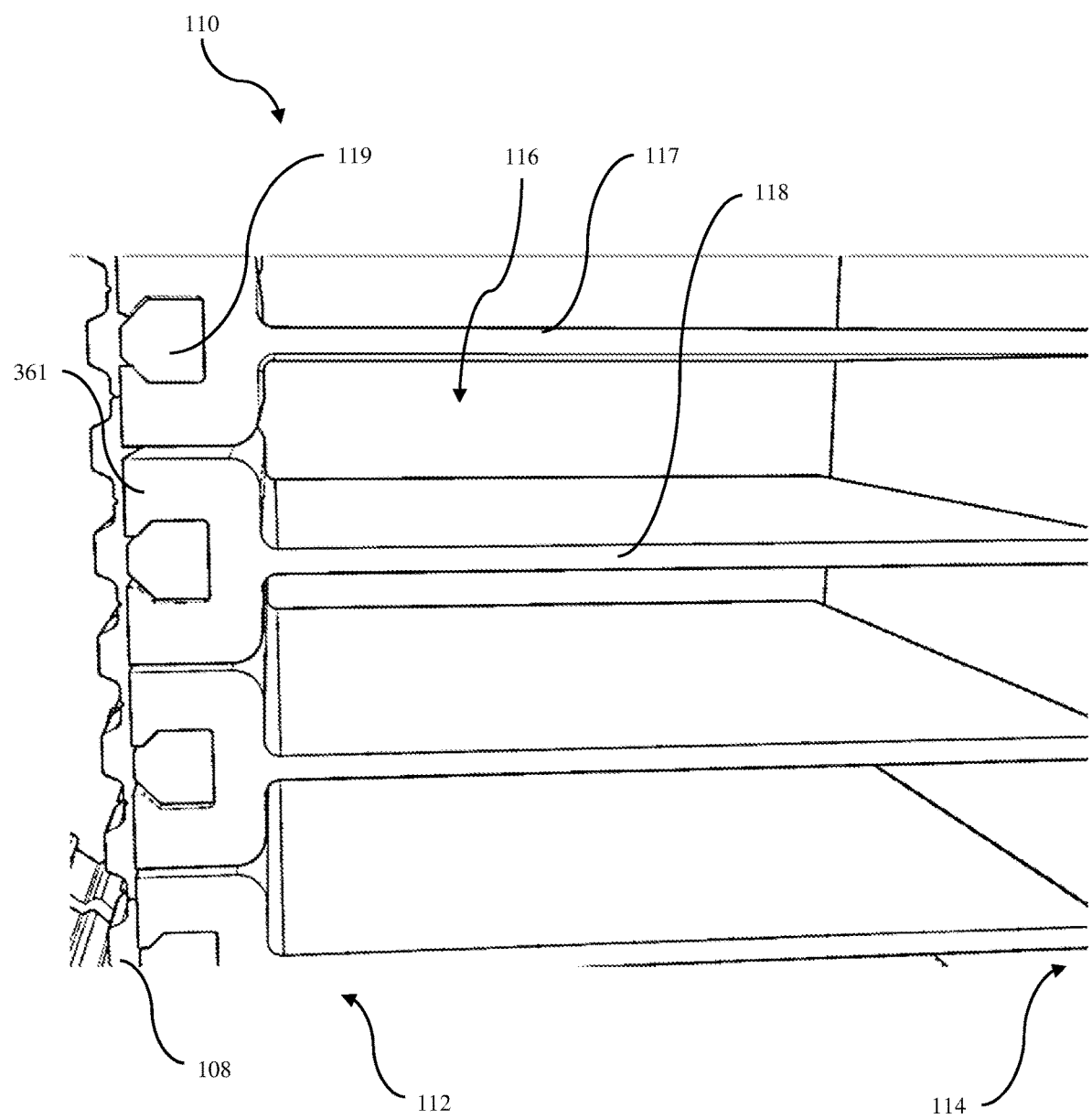
FIG. 3 is a zoomed-in view of the encircled portion of FIG. 2a of a plurality of panels inside of the cartridge for storing and conveying food items, according to an example embodiment.

With reference to the Figures now including FIG. 3, a plurality of panels (110) is shown. The plurality of panels is radially attached to the movable inner looped element (108). As illustrated, a first end (112) of each of the plurality of panels (110) is radially attached to the movable inner looped element (108) such that each of the plurality of panels (110) extends toward the outer looped element (104). A second end (114) of each of the plurality of panels (110) may terminate near, or at the outer looped element (104), and more specifically the inward facing wall of the outer looped element. Thus, a second end (114) of the plurality of panels (110) is at least proximate to an inward facing looped wall of the outer looped element (104). It is understood that in certain embodiments the second ends of the panels contact or engage the inward facing looped wall. As mentioned before the inward facing looped wall may be partially defined by the inward facing wall (162) of the movable door. Stated differently, the inward facing wall sections (163, 166, 162) may define the inward facing looped wall. The second end (114) of each of the panels (110) may abut the inner side of the outer looped element (104), such that each of the plurality of movable chambers (116) is fully enclosed. In other words, the chamber, which is defined by a set of panels (117, 118), the inward facing looped wall of the outer looped element (104), and the movable inner looped element (108). In certain embodiments, a sealing element (160) may be attached or connected to the second end (114) to each of the panels and the edges that abut the walls of the cartridge so to further assist with facilitating a hermetically sealed chamber. The sealing elements may be an edge trim type seal. The sealing may be an elongated u-shaped body configured to be attached to the edge second on the panel such that mouth of the seal receives the second of the seal and such that the body of the seal contact the inward facing looped wall of the outer looped element. The sealing element may comprise rubber, silicone, or other types of materials configured to form a seal. In other embodiments, the side edges of the panels and second ends of the panels may comprise sealing type material that provide the seal or hermetical seal.

Further, the panels (110) may be attached to the movable inner looped element (108) as follows. The movable inner looped element may include a plurality of holes that are vertically and linearly aligned. A transverse row of holes may be used to mount the panels by way of an insert (not illustrated) that secures an attachment (119) to the movable inner looped element (108). Panels (110) may be attached to the movable inner looped element (108) by simply sliding a receiving portion (361) the panel over the attachment (119). In this way, the panels (110) may be readily removed for cleaning from the inner looped element. Lastly, the movable inner looped element (108) may include a receiving portion configured to receive a tracking tooth (not illustrated) that prevent the belt from sliding off of the rollers. Additionally, a sealing portion may be provided on the panels so that when the panels are installed or mounted on the attachment of the inner loop element, the sealing portion of the receiving portions of adjacent panels contact each other providing a further seal. It is also understood that the elements and components of the inner looped element that interfaces with the panels (and the panels themselves) may comprise seals or sealing elements so that a seal is created between engaging surfaces of the inner looped element and each of the panels.

Defined by the plurality panels (110) is a plurality of movable chambers (116). The movable chambers (116) extend between the outer looped element (104) and the movable inner looped element (108) and are defined by a space between a first panel (117) and an adjacent panel (118) that is next to the first panel (117). Each chamber may hold one or more food items when the cartridge is charged with food items. For instance, the food item may be a planar food item, or a food item having at least one planar surface. As a non-limiting embodiment, the food item may be used for a burger vending machine. For instance, a patty (e.g., beef, vegetarian, etc.) may be placed in the chamber. One half of a bun may also be placed in the chamber, or a slice of cheese, to name a few. In another aspect, each of the plurality of movable chambers (116) is a hermetically sealed chamber. This prevents the food items from being contaminated.

Figure 5A:
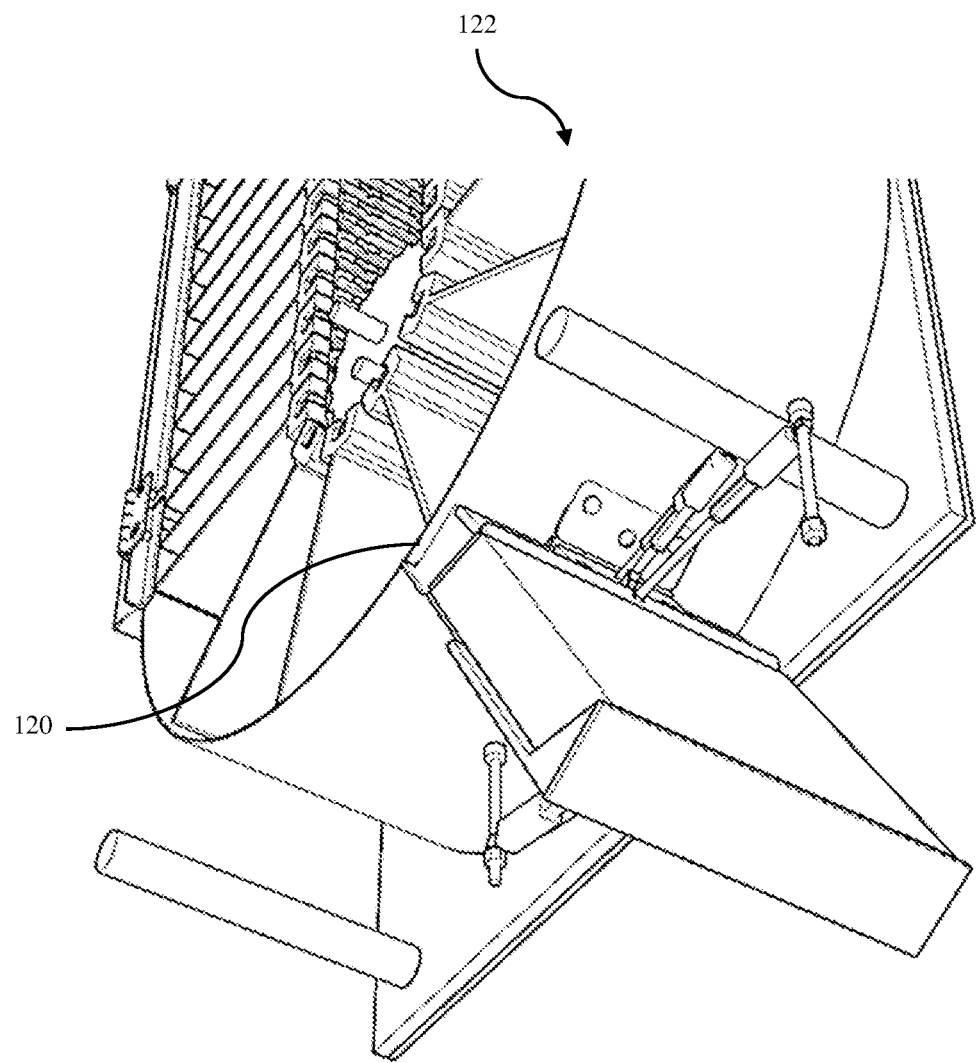
FIG. 5a is a bottom perspective cutaway view of a bottom portion of a cartridge for storing and conveying food items, according to an example embodiment.
Figure 5B:
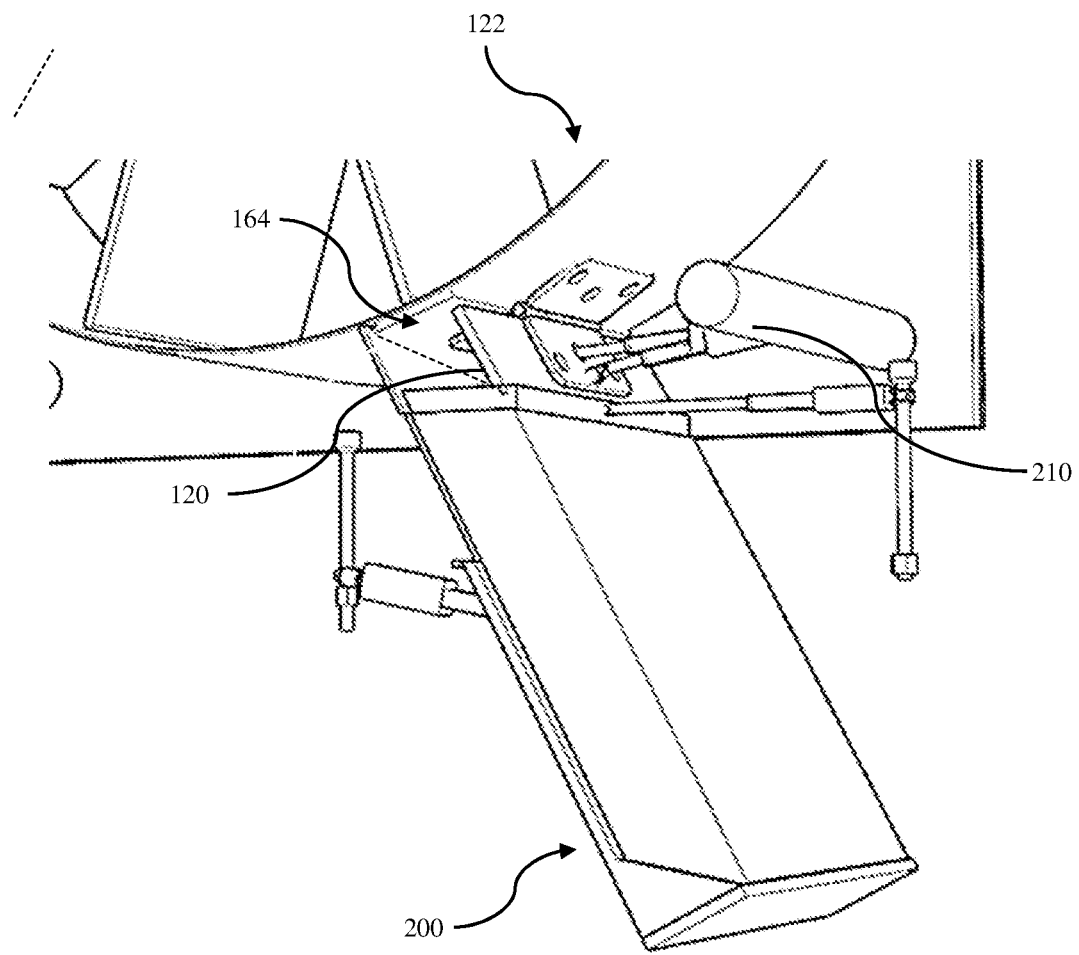
FIG. 5b is a perspective view of a bottom portion of a cartridge for storing and conveying food items, according to an example embodiment.

With reference to the Figures now including FIGS. 5a-5b, a bottom portion of the outer looped element (122) is shown. A second movable door (120) covers an opening (164) that is disposed on the outer looped element (104) that provides access to outside the cartridge (100). The second movable door (130) is disposed on the outer looped element (104) proximate to a bottom end of the outer looped element (104). In this aspect, the movable door (120) enables the cartridge to dispense food items stored inside the cartridge to outside of the cartridge. The shape and size of the second door and opening may be adjusted depending on the size of the food item to be delivered.

The cartridge method of operation includes first charging the cartridge with a plurality of food items. Each food item is stored in a respective chamber. The food items are generally charged into the cartridge in a food safe environment that complies with local laws and regulations that minimize contamination that can cause foodborne illnesses. After charging the cartridge with the food items, the cartridge is sealed. As noted above, one benefit of the cartridge is that the food items are hermetically sealed inside the cartridge. After sealing the cartridge, the cartridge containing the food items therein is then transported to the location that it will be consumed at. For instance, in one embodiment the cartridge is used in a vending machine that serves burgers. In the vending machine, one-by-one, food items are dispensed through the second movable door (120) and opening (164) described above. After a food item is dispensed through the opening (164), the motor (140) engages to move the rotatable rollers, which thereby move the discharged chamber away from the door and a charged chamber to the door. One-by-one, each food item can be dispensed as required by the user. Thus, the cartridge enables on-demand dispensing of food items. The opening (164) may have a shape that may be adjusted for the size of certain food items.

Figure 5C:
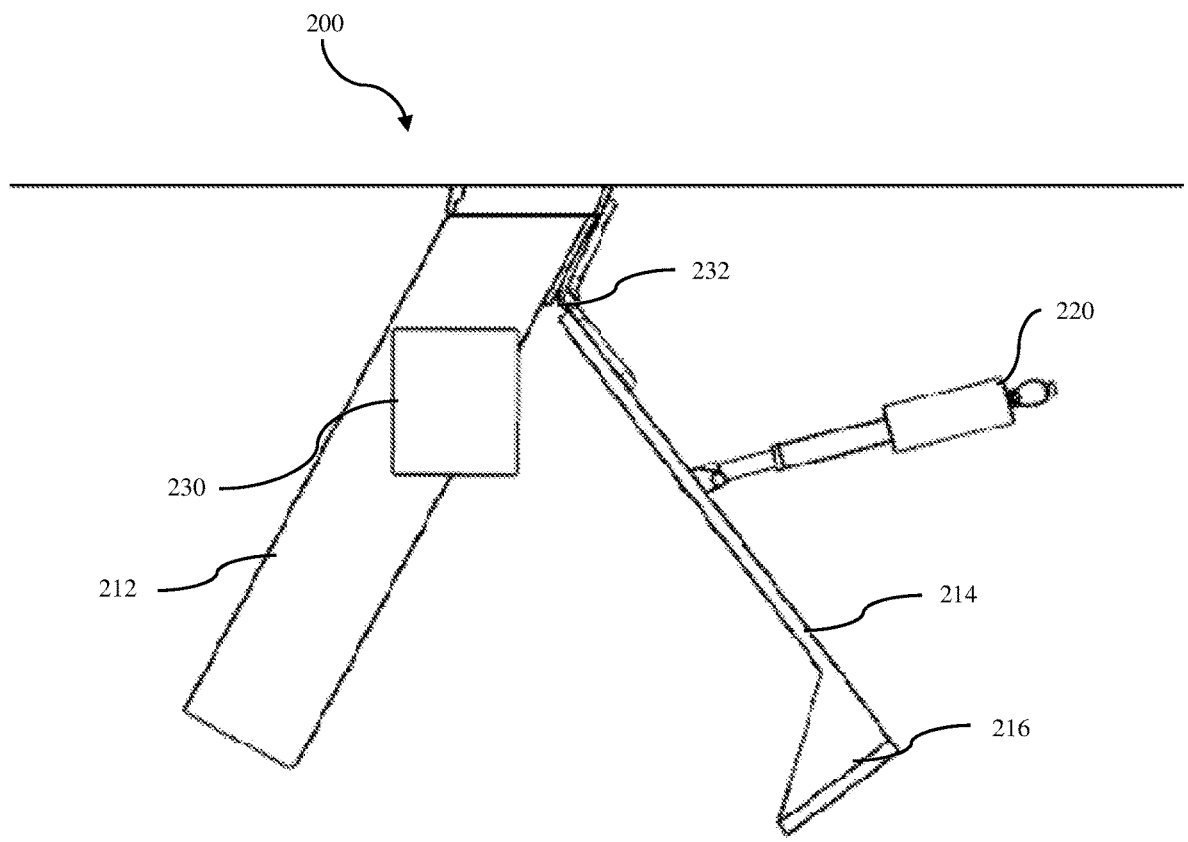
FIG. 5c is a side view of a chute apparatus, according to an example embodiment.

To aid in the discharging of food items, the cartridge may include chute apparatus (200), which is shown most clearly by FIGS. 5b-5c. Chute apparatus (200) is in connection with the door (120), which is opened and closed by a first actuator (210). Chute apparatus (200) includes a chute portion (212) and a hatch portion (214), where the hatch portion (214) is movably engaged with the chute apparatus by a second actuator (220). Chute apparatus may be mounted to the cartridge (100) or another portion of the device that contains the cartridge by a wing (230). Chute apparatus (200) operates by receiving the food item after it has been discharged through the second movable door (120) and opening (164). After receiving the food item, the hatch portion (214) is rotated about a hinged axis (232) to open the chute apparatus (200). Prior to this rotation, the food item is secured in the foot (216) of the chute apparatus. As the chute portion (214) rotates outward, the food item is gently dropped (using gravity) from the chute apparatus (200).

Figure 6:
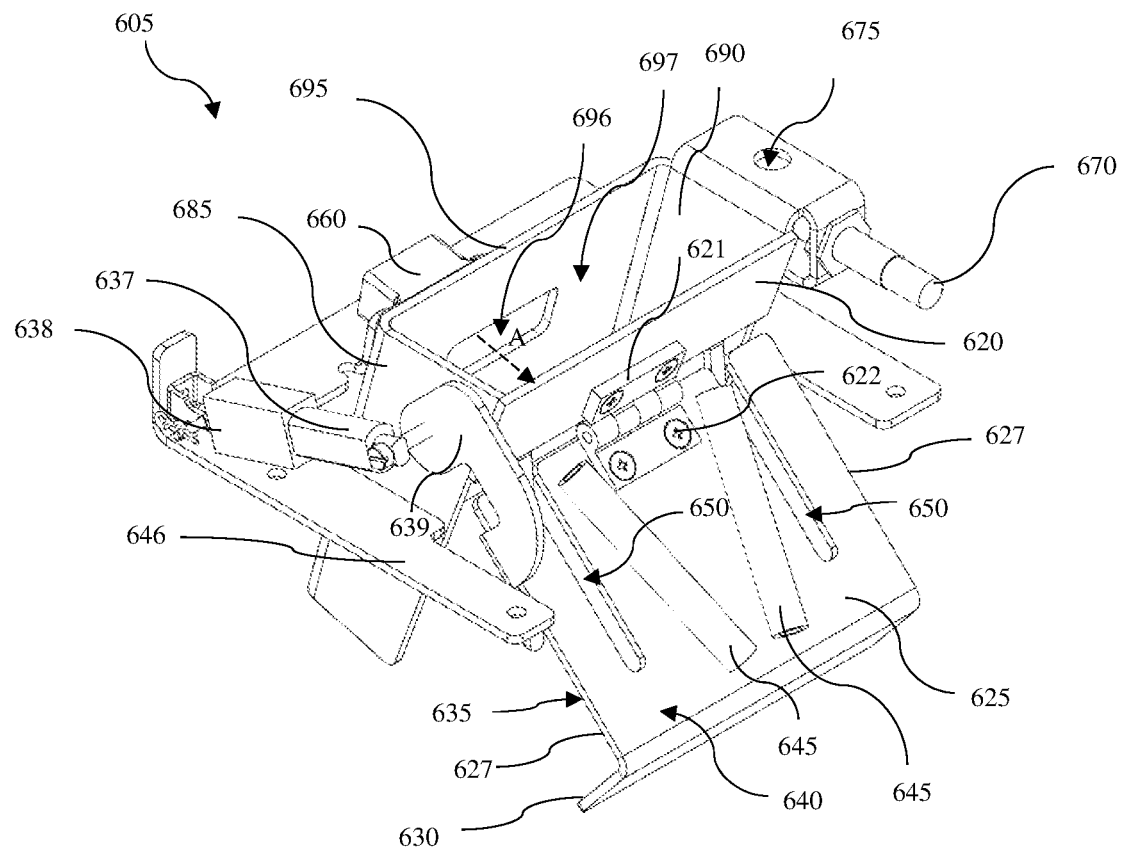
FIG. 6 is a perspective view of another embodiment of a chute apparatus or system for dispensing an item from a dispensing apparatus, wherein the system is in an open configuration, according to an example embodiment.
Figure 7:
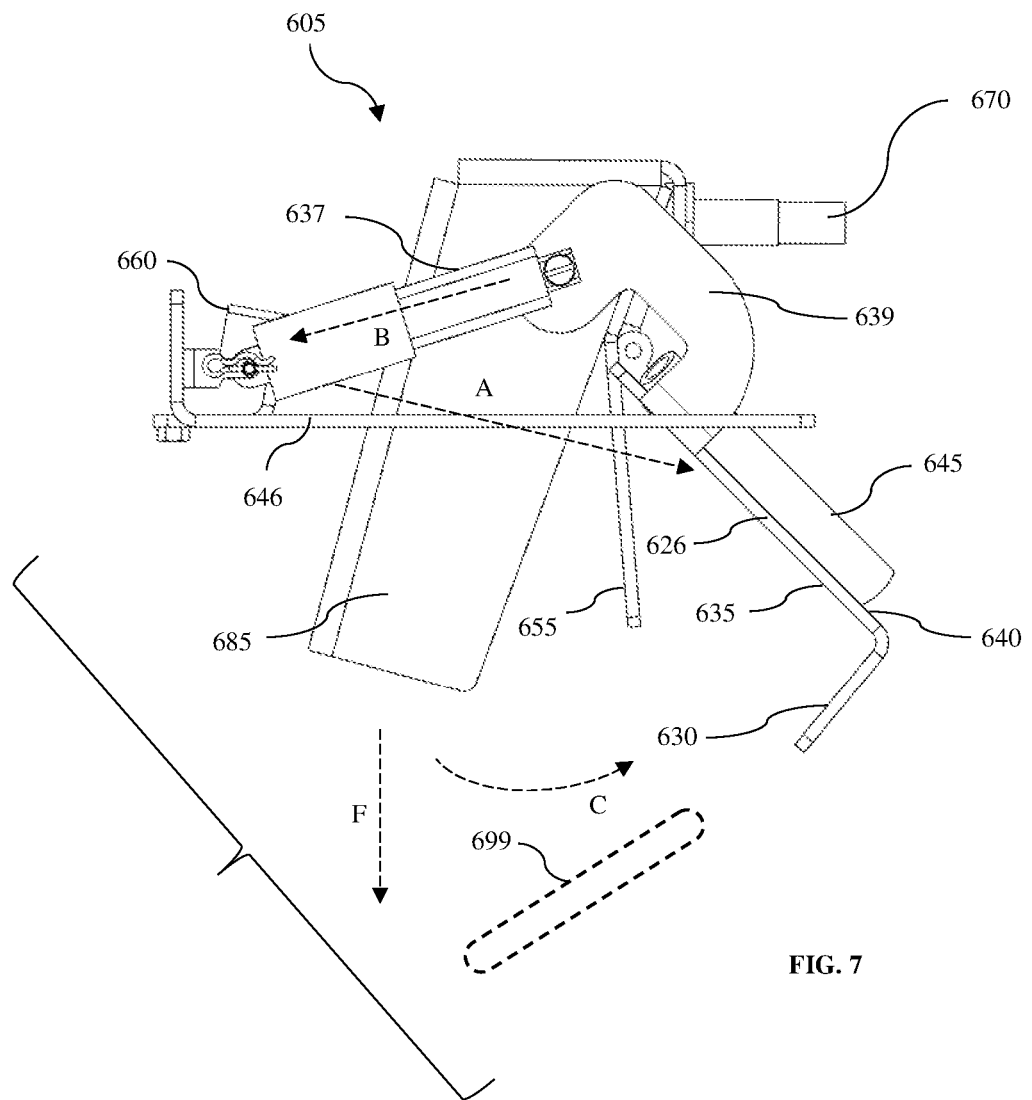
FIG. 7 is a side view of another embodiment of a chute apparatus or system for dispensing an item from a dispensing apparatus, wherein the system is in an open configuration, according to an example embodiment.
Figure 8:
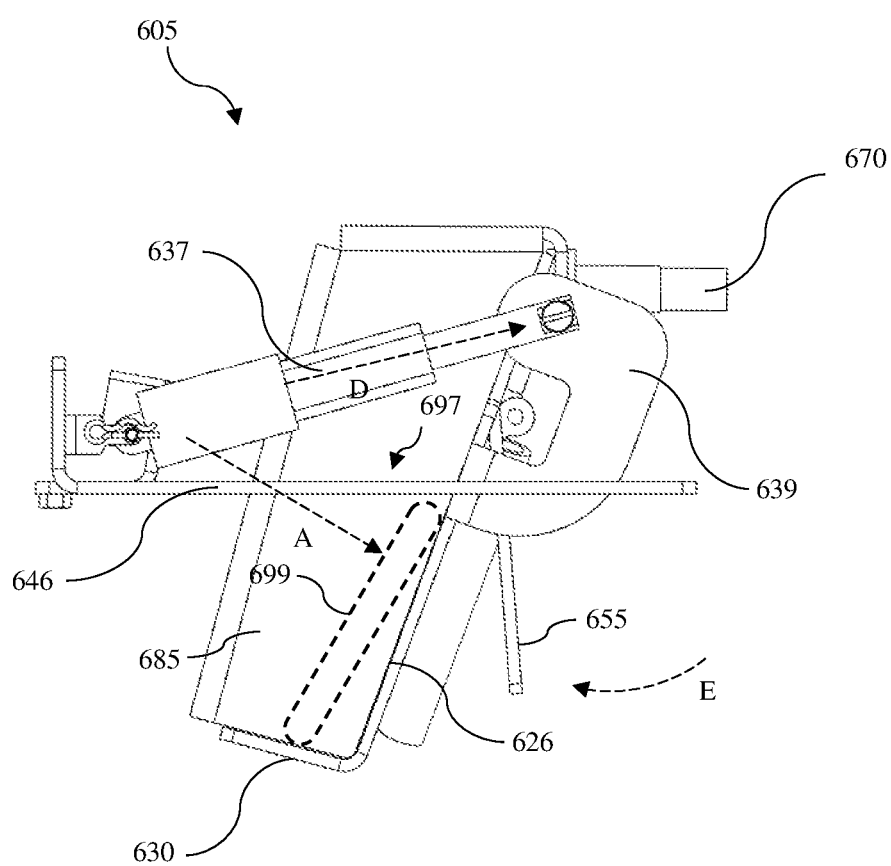
FIG. 8 is a side view of another embodiment of a chute apparatus or system for dispensing an item from a dispensing apparatus, wherein the system is in a closed configuration, according to an example embodiment.
Figure 9:
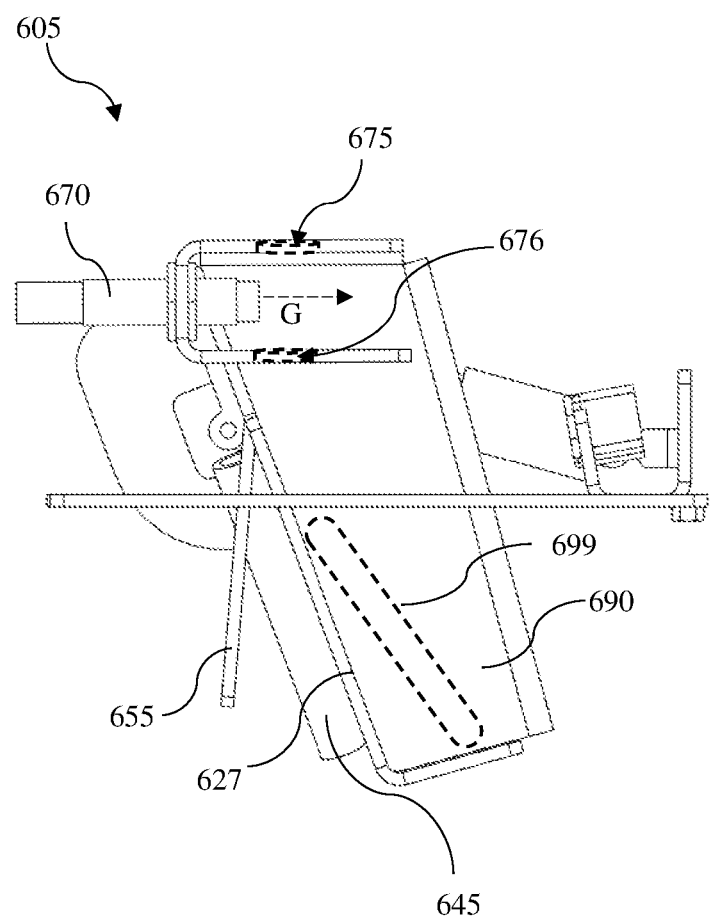
FIG. 9 is a second side view of another embodiment of a chute apparatus or system for dispensing an item from a dispensing apparatus, wherein the system is in a closed configuration, according to an example embodiment.
Figure 10:
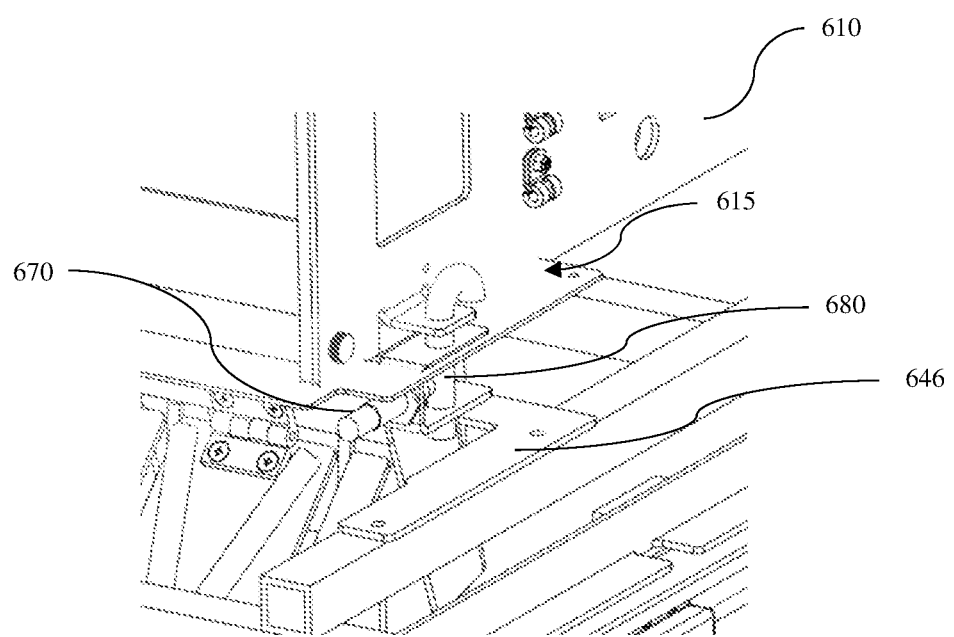
FIG. 10 is a perspective view of another embodiment of a chute apparatus or system for dispensing an item from a dispensing apparatus, wherein the system is attached to a lower portion of a dispensing apparatus, according to an example embodiment.
Figure 11:
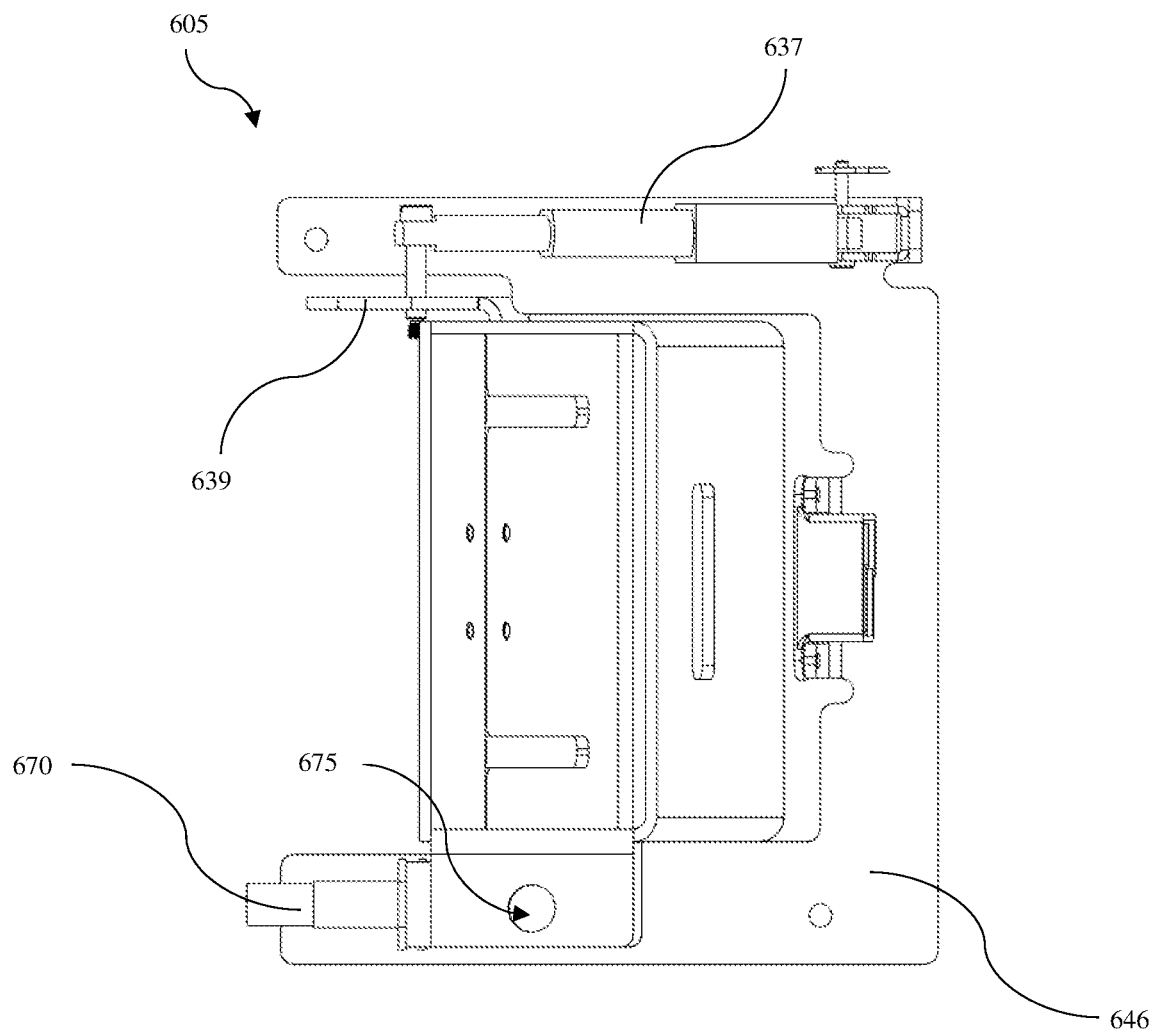
FIG. 11 is a top side view of another embodiment of a chute apparatus or system for dispensing an item from a dispensing apparatus, according to an example embodiment.

FIGS. 6-12 illustrate another embodiment of a chute apparatus or system (605) for dispensing a food item (shown as element (699) in FIG. 8) from a dispensing apparatus. FIGS. 6 and 7 will be discussed together as both FIGS. 6 and 7 illustrate the system in an open configuration. FIGS. 8 and 9 will be discussed together as both FIGS. 8 and 9 illustrate the system in a closed configuration. The system may be disposed proximate to a dispensing apparatus lower portion (615) of a dispensing apparatus (610) (as shown in FIG. 10). In one embodiment, the dispensing apparatus may be the cartridge (100) illustrated in at least FIG. 1. The system may be disposed proximate to the opening 164 of the cartridge so that the system is configured to receive a food item leaving the cartridge.

The system or chute apparatus may include a plate (620). The plate may be a substantially rectangular shape. However other shapes may be used and are within the spirt and scope of the present invention. The plate may include a surface on which a flap (625) may be attached. The flap may be hingedly or movably attached to the plate by a hinge (621) or other rotatable device, with screws (622), or other types of fasteners. Each of the fasteners may include a suction cup, hooks, bolt, set screws, opening configured to attach to protruding element, socket screws U-bolts, twine, etc. However, other types of fasteners may also be used and are within the spirit and scope of the present invention. The flap has an open position (illustrated in FIGS. 6 and 7) and a closed position (illustrated in FIGS. 8 and 9). The hinging element. In the closed position, the system defines a chamber (697) that is configured for receiving a food item. When the system is in the open position or configuration, the system is configured to dispense the food item. A stop (630) extends outward from a flap first surface (635) of a lower portion of the flap. In the present embodiment, the stop assists with maintaining the food item disposed on the flap (as illustrated in FIGS. 8 and 9) when the food item is in the chamber and the system is in the closed state or configuration.

A movable arm (637) is in attachment with the flap and configured to move the flap between the flap open position and the flap closed position. In one embodiment, the movable arm is part of a linear actuator that moves between an extended state (as illustrated in FIGS. 6 and 7) and a retracted state (as illustrated in FIGS. 8 and 9). A second arm (639) may be directly attached, or more directly attached to the flap to allow the flap to move between the closed state and the open state. In one embodiment a linear actuator powered by a power source may move the movable arm between a first position (as illustrated in FIGS. 8 and 9) or closed position and a second position or open state (as illustrated in FIGS. 6 and 7). In the present embodiment, the power source may be the main power source provided by a utility (external from vending machine), a main power source, a battery power source, such as a standard dry cell battery commonly used in low-drain portable electronic devices (i.e., AAA batteries, AA batteries, etc.). Other types of batteries may be used including rechargeable batteries, aluminum air batteries, lithium batteries, paper batteries, lithium-ion polymer batteries, lithium iron phosphate batteries, magnesium iron batteries etc. Additionally, other types of battery applications may be used and are within the spirit and scope of the present invention. For example, a battery stripper pack may also be used. Additionally, other types of power sources may also be used and are within the spirit and scope of the present invention.

For example, in one embodiment, to move from the open position to the closed position, the arm may extend (in the direction of arrowed line D as illustrated in FIG. 8), which moves second arm (639) so that the flap (625) and stop (630) move in the direction of curved arrowed line E). Conversely, in one embodiment, to move from the closed position to the open position, the arm may move to the retracted position (in the direction of arrowed line B as illustrated in FIG. 7), which moves arm 638 so that the flap and stop (630) move in the direction of curved arrowed line C).

The system (605) may also include first panel (685) and a second panel (690) positioned such that when the flap is in the flap closed position, the first panel is at least proximate to a first edge (626) of the flap first surface and the second panel is at least proximate to a second edge (627) of the flap first surface (as illustrate in the closed state in FIGS. 8 and 9). Each of the first panel and the second panel be substantially rectangularly planer shaped bodies. The first panel and the second panel may be shaped to prevent a food item food leaving the chamber with the system is in the closed configuration.

The system (605) may further include a third panel (695) spanning between the first panel (685) and the second panel (690). In one embodiment, third panel may be a substantially rectangular shaped body. However, other shapes may be used and are within the spirit and scope of the present invention. The first panel, second panel and third panel may be manufactured from materials such carbon steel, stainless steel, aluminum, Titanium, other metals or alloys, composites, and ceramics. The component(s) of the first panel, second panel and third panel may be manufactured from a variety of different processes including via a CNC lathe, extrusion, a mold, welding, shearing, punching welding, folding etc. Each of the first panel, second panel and third panel may be attached to each other or may be formed from the same material.

The system (605) also includes a heating element (645) at least proximate to the flap. In the present embodiment, the heating element is positioned near the flap second surface (640) of the flap. The heating element may receive power from the power source via conductors. The heating element may be a metal, ceramic, semiconductor, thick film heater, liquid, etc. However, other heating elements may be used and are within the spirit and scope of the present invention. The heating element is configured such that it heats the flap so that the food item when positioned within the chamber is heated, toasted or cooked. The material of the flap and the stop may be made of conductive material so that heat from the heating element may transmit heat so that the food item may be cooked, heated cooked or toasted. In the present embodiment, the system includes more than one heating element. However, in other embodiments, only one heating element may be used. In the present embodiment, the heating element is positioned proximate to the flap second surface (640) so that the heating element does not interfere or have a negative effect on certain electrical or electro mechanical components of the system, such as the sensors (660), (670) linear actuator (715), or processor (707).

In one embodiment, opening (650) may be included on the flap extending between the flap first surface 635 and a flap second surface (640). In the present embodiment, the opening or cutout may be an elongated shaped opening spanning from a top end of the flap toward and proximate to the bottom end of the flap. However, other shapes may be within the spirit and scope of the present invention. Each of the openings (650) or cutouts are configured to allow a rod to pass through the opening (655).

Each rod (655) may be fixed and attached to the plate (620) or another portion of dispensing apparatus (610). In the present embodiment, the rod is a substantially elongated shaped body. Each rod may be substantially vertically arranged and in attachment with the plate and configured such that the rod passes through the opening (650) when the flap moves between the flap open position and the flap closed position. However, in other embodiments, other shapes of rods may be used and are within the spirit and scope of the present invention. The material of the rod may be made from a variety of materials such as carbon steel, stainless steel, aluminum, Titanium, other metals or alloys, composites, ceramics, polymeric materials such as polycarbonates, or plastics. The component(s) of the rod may be manufactured from a variety of different processes including via a CNC lathe, extrusion, a mold, welding, shearing, punching welding, folding etc. In the open position (as illustrated in FIGS. 6 and 7) the rod is positioned in front of the flap first surface (635) and wherein the flap closed position (as illustrated in FIGS. 8 and 9) the rod is positioned behind the flap first surface. In one embodiment, when the system (605) moves from the closed position to the open position, each rod passes through the opening (650) or cutout on the flap and further causes or facilitates the food (699) to move (in the direction of arrowed line F in FIG. 7) thereby dispensing the food item.

In one embodiment, a sensor (660) may be positioned in front of the flap first surface (635) is configured for detecting if the item (699) is disposed on the flap or within the chute. The sensor may be an optical sensor, or any other type of senor configured for determining if an item is positioned within a certain area. In one embodiment, the sensor (660) is positioned in front of the third panel (695). The third panel has a third panel opening (696) such that the third panel does not affect a sensing path (as illustrated by arrowed line A) for the sensor as illustrated in FIG. 6. In other words, opening (696) on the third panel (695) is positioned between the sensor (660) and the flap (625) to provide, between the sensor and the flap, a sensing path (as illustrated by arrowed line A) that that not affected by the third panel (695).

The sensor (660) may be an optical sensor. However, other types of sensors may be used such as ultrasonic sensor, laser senor, pressure sensor, electrical sensor, global positioning system sensor, and wherein the sensor (660) may be one integrated unit or may comprise a plurality of sensors distributed throughout the system in different locations. The sensor (660) may be in communication with a processor via a conductor or wirelessly so that the processor of the system (605) may take appropriate actions to clear the chamber if needed.

In one embodiment, the system (605) may include a sensor (670) positioned proximate to the flap. The sensor may be configured to detect if a locator rod or rod (680) is positioned proximate to the flap. The locator rod may be used for determining if the flap is adequately positioned relative to a portion of the dispensing apparatus (610). For example, in FIG. 10, illustrates the system in attachment with the lower portion (615) of a dispensing apparatus (610).

As mentioned above, the lower portion of the dispensing apparatus may be the lower portion of the cartridge. In one embodiment, the sensor may be an optical sensor configured to detect if the locator rod is positioned as illustrated in FIG. 10 so that the locator rod passes through at least opening (675) and (676). In operation, when an operator is assembling the device. The operator would need to align the system so that the locator rod passes through at least one opening (675) and opening (676). If the system is not aligned correctly or adequately positioned relative to dispensing apparatus, then the locator rod may not be able to be received by opening (675) and opening (676) and the sensor will detect that the locator rod is not where it should be and thus send information to the processor to relay an error message to the operator via a graphical interface or sound.

The system (605) includes a c-shaped frame structure (646). The c-shaped frame structure is a substantially planar shaped body substantially shaped like the letter C. The frame structure provides an area where various components of the system may be attached, and which may be attached to other portions of the dispensing apparatus. In one embodiment, the sensor (660), a first portion (638) of the movable arm (637), and the first panel (685) and the second panel (690) are in attachment with a c-shaped frame structure. The c-shaped frame structure may comprise material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™. The c-shaped frame may be formed from a single piece or from several individual pieces joined or coupled together. The components of the c shaped frame may be manufactured from a variety of different processes including an extrusion process, a mold, welding, shearing, punching welding, folding etc. The c-shaped frame structure allows the first sensor (660) to be positioned away from the heating element so that the heating element is not affected by the heat dispensed from the heating element.

Figure 12:
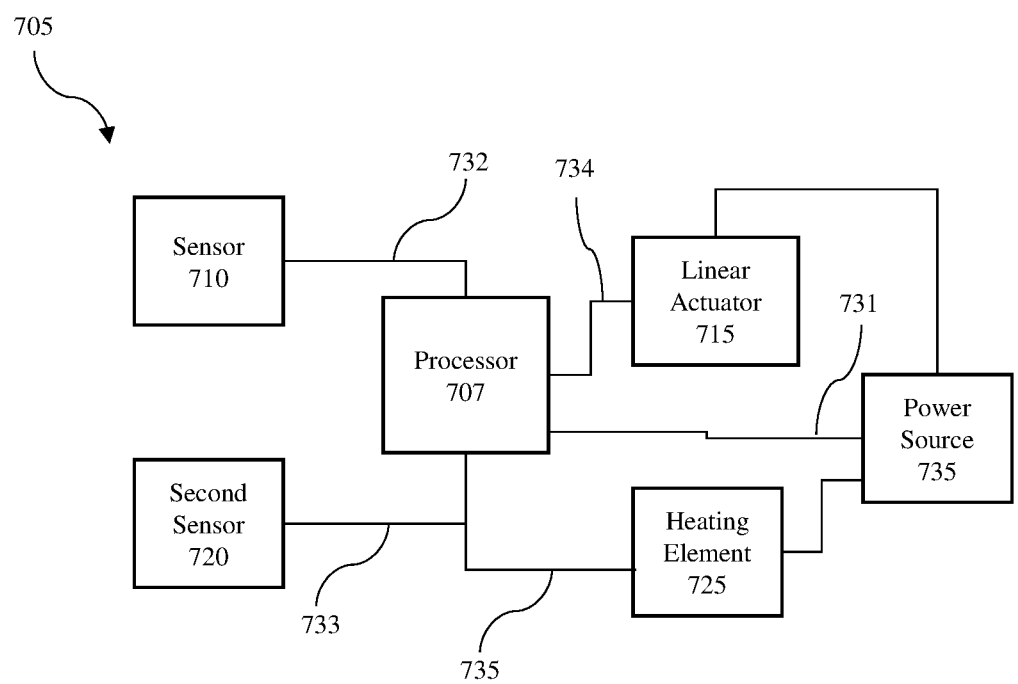
FIG. 12 is a diagram illustrating certain electrical components of a chute apparatus or system for dispensing an item from a dispensing apparatus, according to an example embodiment.

FIG. 12 is a diagram (705) illustrating certain electrical components of a chute apparatus or system (605) for dispensing an item from a dispensing apparatus, according to an example embodiment. FIG. 12 illustrates the processor (707) of the system. In one embodiment, the processor may be a programmable logic controller. A programmable logic controller or programmable controller is an industrial computer that has been ruggedized and adapted for the control of manufacturing processes, such as assembly lines, machines, robotic devices, or any activity that requires high reliability, ease of programming, and process fault diagnosis. The processor may include preprogrammed logic for operating the device. The processor may be in electric communication with a power source (735) via electrical conductors. The power source may be a battery power source or utility power source provided by a utility. The processor is also in electrical communication with the sensor (710), second sensor (720), linear actuator (for moving the movable arm) (715), and heating element (725) via conductors (732), (733), (734), (735), respectively. It is also understood that that the power source (735) may also be in electrical communication and configured for powering all of the electrical components of the system (605), including the sensor (710), second sensor (720), linear actuator (for moving the movable arm) (715), and heating element (725). It is understood that while only one processor is illustrated more than one processor may be used and is within the spirit and scope of the present invention. Sensor (710) in FIG. 12 corresponds with sensor (660) in FIG. 6 and sensor (720) in FIG. 12 corresponds to sensor (670) in FIG. 6.

Figure 13:
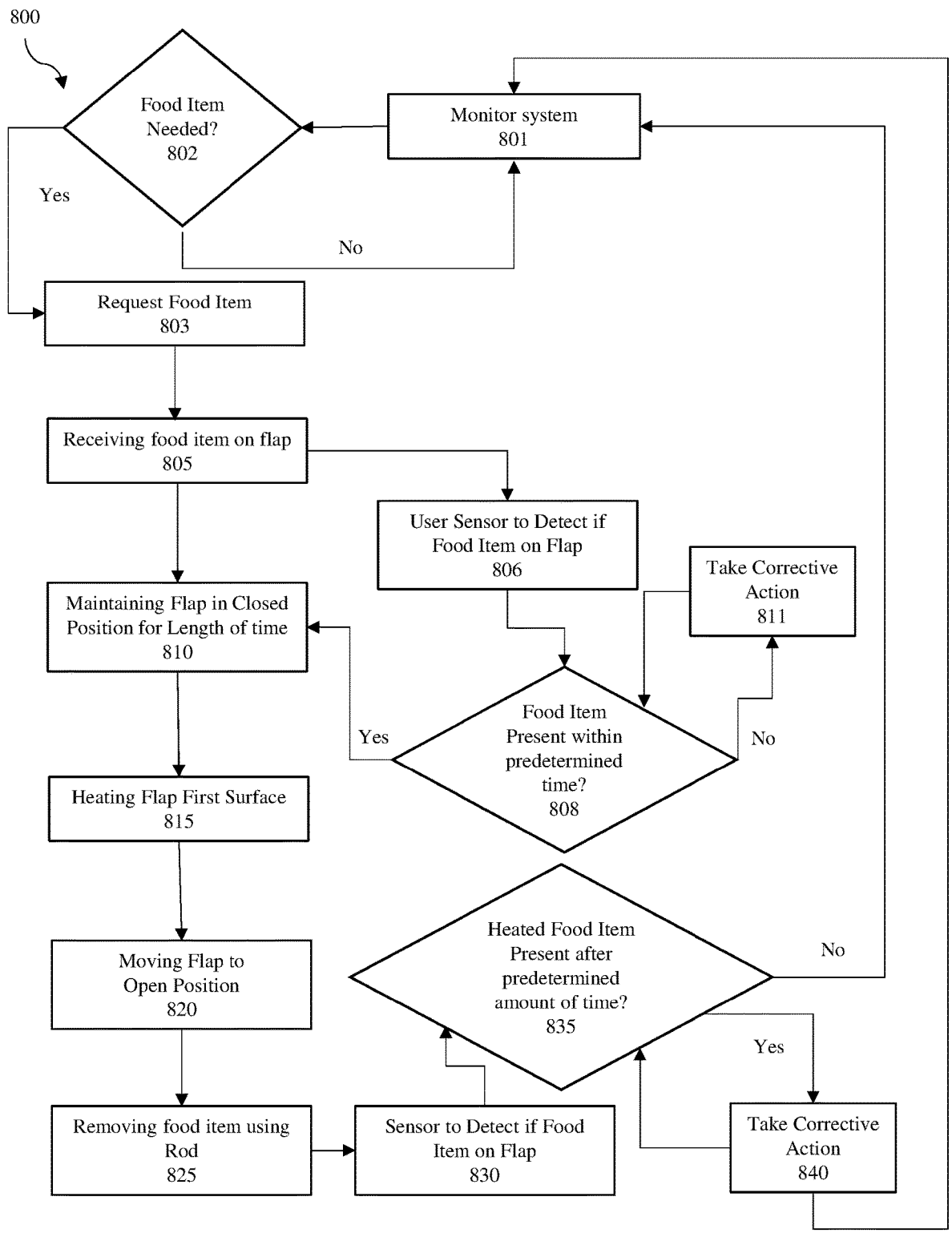
FIG. 13 is a flow chart illustrating certain steps for a method of dispensing a food item using a chute apparatus or system for dispensing an item from a dispensing apparatus, according to an example embodiment.

FIG. 13 is a flow chart (800) illustrating certain steps for a method of dispensing a food item using a chute apparatus or system (605) for dispensing an item from a dispensing apparatus, according to an example embodiment. In one embodiment, the system is configured to be in attachment with a second dispensing device such as at lower portion of the cartridge (200). In one embodiment, the system is configured for using the processor (707) to monitor the system, as in step (801), to determine if a request for a food item is needed. In step (802), if a food item is needed, then the process moves to step (803) and the processor (707), will send a request for a food item. A request for the food item may be made on a display to the user which is configured to receive user input via a user interface. In other embodiments, the system is configured to not receive a request, but simply determine if a food item is needed.

In step (803), if a request for a food item is placed, then, the system is configured to receive a food item. As explained above, a food item may be dispensed out of opening (164) of the lower end of the cartridge. The system, in step (805), is configured for receiving a food item onto the flap first surface (635) of flap (625). The flap in the closed position is angled so a that a terminating end of the stop (630) is angled upward relative to a horizontal plan to facilitate maintaining the food item or item within the chamber (697) (as illustrated in FIG. 8) and on the flap. Typically, step (805) is completed when the system is in the closed configuration (as illustrated in FIGS. 8 and 9). The food item may be a food item that is consumable, such as a bun, meat or vegetarian patty, or any other item that can fit into the compartment (697). In one embodiment, the system is configured to maintain the flap (625) in the closed position for a certain period or length of time. Next, after the system receives the food item onto the flap first surface, then in step (810), the system is configured to maintain the flap in a closed position (as illustrated in FIG. 8) for a preprogrammed amount of time. In the flap closed position, the stop (630) holds the food item on the first dispensing device.

In one embodiment, in step (806), sensor (660) may be used to detect if the food item is within the compartment. The sensor may be an optical sensor that detects if the food item is within a sensing path (represented by line A in FIG. 8) of the optical sensor. However, other types of sensors may be used and are within the spirit and scope of the present invention. The sensor (660) may send data via conductors (732) to the processor for the processor, using the preprogrammed instructions will determine if a food item is present, as shown in step (808). In other embodiments, sensor (660) may send a signal to the processor that the food item is present or not and maybe configured it for calculating if food item or other item is present within the chamber within a predetermined amount of time before sending information to the processor. In certain embodiments, the predetermined amount of time may be programmed and stored in the processor. The predetermined amount of time may depend on completion of certain steps that occur in the order of operations after a request for a cooked item received. For example, in one embodiment, the predetermined amount of time, may be 3-5 seconds after the panels are rotated and a food item is expected to fall into the chute. In other embodiments, the system may also include other sensor or sensors for determining the configurations of the system; for example, determining if the system and flap are in the closed configuration or position or in the open configuration or position.

If, in step (808) the processer determines that a food is not present, then in step (811), then the processer will determine that corrective action may be needed. Corrective action may include a variety of different actions such as, moving the panels (110), a cycle reset, etc., send an error message to a remote computing device of an operator that may be monitoring the system. However other corrective actions may be completed and are within the spirit and scope of the present invention.

If in step (808) the processer determines that a food item is present, then in step (810), the processor (707), may send a signal to heating element (735) so that the heating element may begin to heat the flap first surface so that the item (699) may be heated for a predetermined amount of time. It is understood that in certain embodiments, the amount of time that the heating element heats the flap first surface (635) may be adjusted depending on a variety of factors including user preference, food item, heating element calibration, ambient temperature etc.

Next, in step (820), the system (605) may move the flap from the flap closed position to a flap open position using a movable arm (637) (as explained above). When the flap moves from the closed position (as illustrated in FIG. 8 and FIG. 9) to the open position (as illustrated in FIG. 6 and FIG. 7), then in step (825), the system is configured for removing the food item (699) from the first dispensing device by using a rod (655) that passes through an opening (655) in flap (625) when the flap moves in the direction of arrowed line C as the movable arm retracts (in the direction of arrowed line B, which causes second arm (639) to move the flap to the open configuration).

FIG. 6 illustrates a food item (699) falling or moving downward in the direction of arrowed line F as it leaves the system (605). As explained above, the rod assists removing the food item or item from the chamber as the flap moves (in the direction of arrowed line C) from the closed position to the open position. To move the movable arm, when the logic used in connection with the processor determines that such movement is needed, the processor may send a signal via conductors (734) to the movable arm, linear actuator, motor etc. that is configured for moving the movable arm so that that the arm causes the flap to move between the open and closed configuration.

Next, in step (830), the system may use the sensor (660), to detect if a food item (699) is positioned within the chamber. Next, the process moves to step (835), and the sensor (660) will send a signal to the processor (707) via conductors (732) for processor to determine if the heated food item is within the chamber after a second predetermined amount of time and for determining the next action to take place. In other embodiments, the sensor third opening (696) on the third panel (695) positioned between the sensor and the flap allows, between the sensor (660) and the flap (625), a sensing path (as shown by arrowed line A) that that not affected by the panel (695). This is important because the opening (696) and position of the sensor prevents the negative effects that the heating element may have on the sensor if the sensor were positioned within the chamber (697) or closer to the flap first surface (635) or the flap second surface (640). In other embodiments, the sensor (660) may detect and determine if a food item is within the chamber before sending the signal to the processor (707). In one embodiment, the second predetermined amount of time may be after 3-5 seconds after the flap (625) moves into the open configuration. However, other embodiments for the second predetermined amount of time may be used and are within the spirit and scope of the present invention.

Next, after step (835), if the processor determines that the food item is still within the chute after the predetermined amount of time, then the process moves to step (840). In step (840), the processor may determine to take corrective action. In on embodiment, such corrective action may be to re-open and close the flap (625) (in attempt to dislodge the item), a cycle reset, an error message, an error message sent to a remote computing device of an operator etc. However, other embodiments may be used and are within the spirit and scope of the present invention. Next, after step (835), if the processor determines that the food item is not still within the chute after the predetermined amount of time, then the process moves to step (801), the monitoring stage, to determine if a food item is needed.

Additionally, the system (605) may be configured to determine if the first dispensing device is adequately aligned relative to the second dispensing device by using a second sensor (670) positioned proximate to the flap (625) to detect if at least a portion of a second rod is in a second sensing path (represented as arrowed line G in FIG. 9) of the second sensor (670). For example, in one embodiment, the system is configured such that second sensor (670) is configured for detecting if the locator rod or rod (680) (as shown in FIG. 10) is positioned passing through at least one of openings (675) and (676). Second sensor (670) sends data via the conductor (733) to the processor for the processor to determine if the locator rod (680) is positioned within the sensing path of the second sensor. In other embodiments, the second sensor will send a signal to the processor (707) notifying the processor that the locator rod is not received or is received by the openings (675) and (676), which indicates that the system is not properly aligned with the dispensing apparatus (610). This is important because if the system is not properly aligned, then the system (605) will not properly receive a food item into the chamber. In certain embodiments, if the locator rod or rod (680) is not received by the openings (675) and (676), then the processor (707) may send an error message or signal and prevent the system from functioning. Similar to the first sensor (660), the second sensor, may also be an ultrasonic sensor, laser sensor, pressure sensor, or electrical sensor, and wherein sensor may be one integrated unit or may comprise a plurality of sensors distributed throughout the ship or system in different locations. It is understood that some or all of the steps display in FIG. 13 may not be needed or some of the steps may be completed in a different combination. Additionally, it is also understood that FIGS. 6-12 are drawn to scale.

Figure 14:
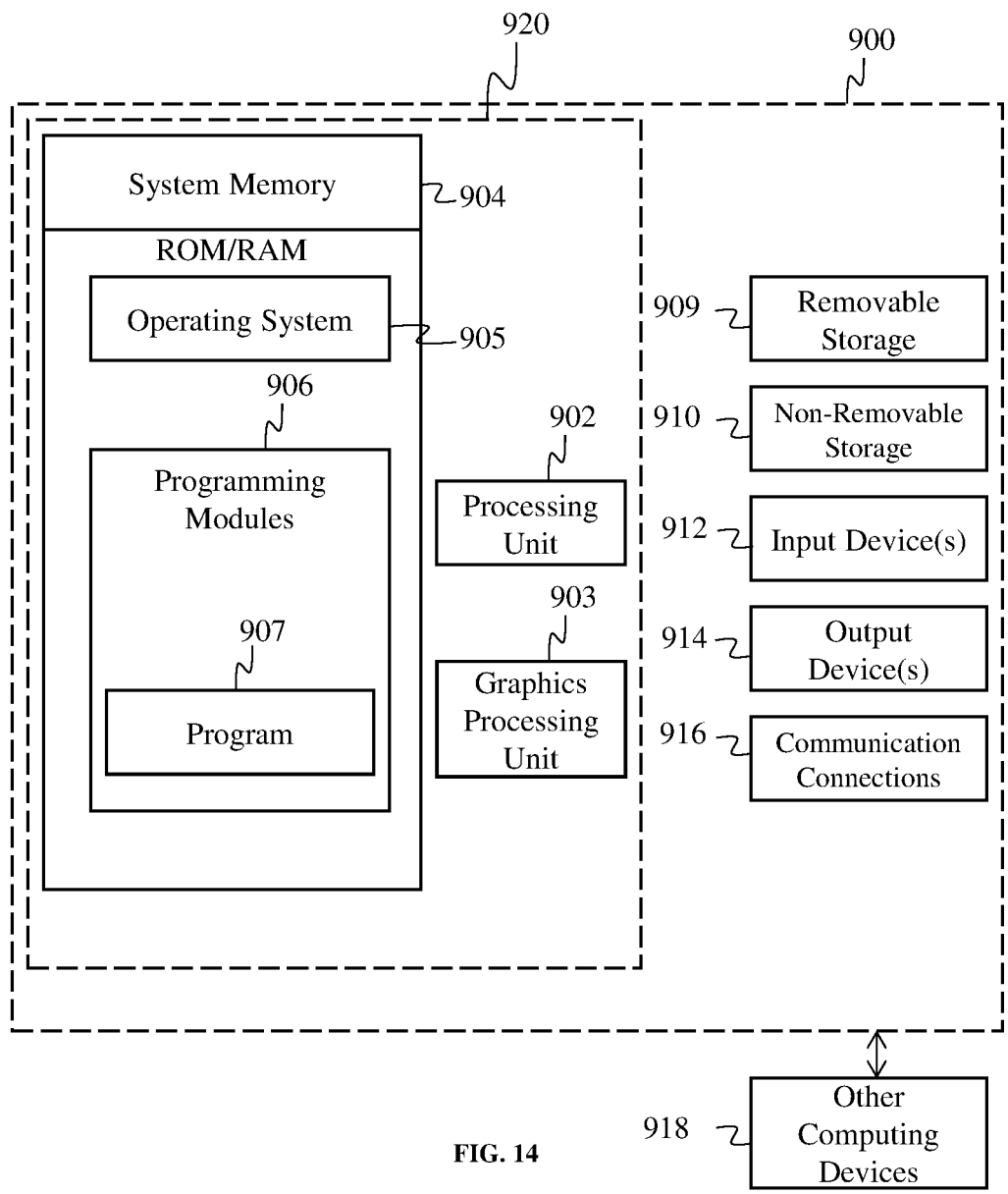
FIG. 14 is a block diagram of a system including an example computing device and other computing devices.

FIG. 14 is a block diagram of an example computing device and other computing devices, which may a processor used by the system. Consistent with the embodiments described herein, the aforementioned actions performed by processor (707) may be implemented in a computing device, such as the computing device (900) of FIG. 9. Any suitable combination of hardware, software, or firmware may be used to implement the computing device (900). The aforementioned system, device, and processors are examples and other systems, devices, and processors may comprise the aforementioned computing device. Furthermore, computing device (500) may be unitized for the method and processes shown in FIG. 13 above.

With reference to FIG. 14, a system (605) consistent with an embodiment of the invention may include a plurality of computing devices, such as computing device (900). In a basic configuration, computing device (900) may include at least one processing unit (902) and a system memory (904). Depending on the configuration and type of computing device, system memory (904) may comprise, but is not limited to, volatile (e.g., random access memory (RAM)), non-volatile (e.g., read-only memory (ROM)), flash memory, or any combination or memory. System memory (904) may include operating system (905), one or more programming modules (906) (such as program module (907). The system, for example, may be suitable for controlling computing device's (500) operation. In one embodiment, programming modules (906) may include, for example, a program module (907). Furthermore, embodiments of the invention may be practiced in conjunction with a graphics library, other operating systems, or any other application program and is not limited to any particular application or system. This basic configuration is illustrated in FIG. 14 by those components within a dashed line (920).

Computing device (900) may have additional features or functionality. For example, computing device (900) may also include additional data storage devices (removable and/or non-removable) such as, for example, magnetic disks, optical disks, or tape. Such additional storage is illustrated in FIG. 14 by a removable storage (909) and a non-removable storage (910). Computer storage media may include volatile and nonvolatile, removable and non-removable media implemented in any method or technology for storage of information, such as computer readable instructions, data structures, program modules, or other data. System memory (904), removable storage (909), and non-removable storage (910) are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device (900). Any such computer storage media may be part of device (900). Computing device (900) may also have input device(s) (912) such as a keyboard, a mouse, a pen, a sound input device, a camera, a touch input device, etc. Output device(s) (914) such as a display, speakers, a printer, or etc. may also be included. The aforementioned devices are only examples, and other devices may be added or substituted.

Computing device (900) may also contain a communication connection (916) that may allow device (900) to communicate with other computing devices (918), such as over a network in a distributed computing environment, for example, an intranet or the Internet. Communication connection (916) is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory (904), including operating system (905). While executing on processing unit (902), programming modules (906) may perform processes including, for example, one or more of the methods shown in FIG. 13 above. Computing device (902) may also include a graphics processing unit 903, which supplements the processing capabilities of processor (902), and which may execute programming modules (906), including all or a portion of those processes and methods shown in FIG. 13 above. The aforementioned processes are examples, and processing units (902) may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general-purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A system for dispensing an item from a dispensing apparatus, wherein
the system is attached to a dispensing apparatus lower portion of the dispensing apparatus,
the system comprising:
a plate;
a flap movably attached to the plate, the flap having a flap open position and a flap closed position;
a stop extending outward from a flap first surface of a flap lower portion in both the flap open position and the flap closed position;
a movable arm in attachment with the flap configured to move the flap between the flap open position and the flap closed position;
a heating element at least proximate to the flap;
an opening on the flap extending between the flap first surface and a flap second surface; and
a rod substantially vertically arranged and in attachment with the plate.

2. The system of claim 1, wherein in the flap open position the rod is positioned in front of the flap first surface and wherein the flap closed position the rod is positioned behind the flap first surface.

3. The system of claim 2, wherein a sensor positioned in front of the flap first surface is configured for detecting if the item is disposed on the flap.

4. The system of claim 3, wherein a second sensor positioned proximate to the flap is configured to detect if a second rod is positioned proximate to the flap for determining if the flap is adequately positioned relative to a portion of the dispensing apparatus.

5. The system of claim 4, wherein the system further comprises a first panel and a second panel positioned such that when the flap is in the flap closed position the first panel is at least proximate to a first edge of the flap first surface and the second panel is at least proximate to a second edge of the flap first surface.

6. The system of claim 5, wherein the system further comprises a third panel spanning between the first panel and the second panel.

7. The system of claim 6, wherein the sensor is positioned in front of the third panel and wherein the third panel has a third panel opening such that the third panel does not affect a sensing path for the sensor.

8. The system of claim 7, wherein the sensor, a first portion of the movable arm, and the first panel and the second panel are in attachment with a c-shaped frame structure.

9. A system for dispensing an item from a dispensing apparatus, wherein the system is attached to a dispensing apparatus lower portion of the dispensing apparatus, the system comprising:
a plate;
a flap movably attached to the plate, the flap having a flap open position and a flap closed position;
a stop extending outward from a flap first surface of the flap in both the flap open position and the flap closed position;
a movable arm in attachment with the flap configured to move the flap between the open position and closed position;
an opening on the flap extending between the flap first surface and a flap second surface of the flap; and
at least one rod substantially vertically arranged and in attachment with the plate.

10. The system of claim 9, wherein, in the flap open position, a rod is positioned in front of the flap first surface and wherein the flap closed position the rod is positioned behind the flap first surface.

11. The system of claim 9, wherein a heating element is disposed close to the flap second surface and configured for heating the flap first surface.

12. The system of claim 9, wherein a sensor positioned in front of the flap first surface is configured for detecting if the item is disposed on the flap.

13. The system of claim 12, wherein a second sensor positioned proximate to the flap is configured to detect if a second rod is positioned proximate to the flap for determining if the flap is adequately positioned relative to a portion of the dispensing apparatus.

14. The system of claim 12, wherein the sensor is positioned in front of the flap and wherein a panel has a panel opening such that the panel does not affect a sensing path for the sensor that extends between the panel and the flap.

15. A method of dispensing a food item, wherein the method comprises:
receiving on a flap of a first dispensing device, from a second dispensing device, the food item;
maintaining the flap in a flap closed position, for a preprogrammed length of time, wherein in the flap closed position a stop holds the food item on the first dispensing device;
moving the flap from the flap closed position to a flap open position using a movable arm;
removing the food item from the first dispensing device by using a rod that passes through an opening in flap when the flap moves from the flap closed position to the flap closed position.

16. The method of claim 15 further comprising heating a flap first surface of the flap such that the food item is heated, using a heating element disposed proximate to a flap second surface of the flap.

17. The method of claim 15, further comprising using a sensor positioned in front of the flap to detect if the item is disposed on the flap.

18. The method of claim 17 further comprising using an opening on a panel positioned between the sensor and the flap to provide, between the sensor and the flap, a sensing path that that not affected by the panel.

19. The method of claim 17, further comprising detecting if the first dispensing device is adequately aligned relative to the second dispensing device by using a second sensor positioned proximate to the flap to detect if at least a portion of a second rod is in a second sensing path of the second sensor.

* * * * *